(12) United States Patent
Sakai et al.

(10) Patent No.: US 8,510,111 B2
(45) Date of Patent: Aug. 13, 2013

(54) SPEECH RECOGNITION APPARATUS AND METHOD AND PROGRAM THEREFOR

(75) Inventors: Masaru Sakai, Kawasaki (JP); Hiroshi Fujimura, Kawasaki (JP); Shinichi Tanaka, Kawasaki (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 1308 days.

(21) Appl. No.: 12/028,067

(22) Filed: Feb. 8, 2008

(65) Prior Publication Data

US 2008/0243506 A1    Oct. 2, 2008

(30) Foreign Application Priority Data

Mar. 28, 2007 (JP) ................................. 2007-085698

(51) Int. Cl.
*G10L 15/04* (2013.01)
*G10L 15/14* (2006.01)
*G10L 15/28* (2013.01)
*G10L 15/06* (2013.01)
*G10L 15/26* (2006.01)

(52) U.S. Cl.
USPC ..... 704/254; 704/256; 704/256.2; 704/256.4; 704/250; 704/255; 704/251; 704/244; 704/235; 704/243

(58) Field of Classification Search
USPC .................. 704/254, 256, 256.2, 256.4, 250, 704/255, 251, 244
See application file for complete search history.

(56) References Cited

U.S. PATENT DOCUMENTS

| | | | | |
|---|---|---|---|---|
| 4,827,521 A | * | 5/1989 | Bahl et al. | 704/256.4 |
| 5,027,406 A | * | 6/1991 | Roberts et al. | 704/244 |
| 5,050,215 A | * | 9/1991 | Nishimura | 704/256.4 |
| 5,515,475 A | * | 5/1996 | Gupta et al. | 704/242 |
| 5,724,487 A | * | 3/1998 | Streit | 706/25 |

(Continued)

OTHER PUBLICATIONS

M. A. Siegler and R. M. Stern, "On the effects of speech rate in large vocabulary speech recognition systems," Proc. IEEE Int. Conf. Acoustics, Speech, Signal Processing (ICASSP), pp. 612-615, 1995.*

(Continued)

*Primary Examiner* — Edgar Guerra-Erazo
(74) *Attorney, Agent, or Firm* — Ohlandt, Greeley, Ruggiero & Perle, L.L.P.

(57) ABSTRACT

A speech recognition apparatus includes a generating unit generating a speech-feature vector expressing a feature for each of frames obtained by dividing an input speech, a storage unit storing a first acoustic model obtained by modeling a feature of each word by using a state transition model, a storage unit configured to store at least one second acoustic model, a calculation unit calculating, for each state, a first probability of transition to an at-end-frame state to obtain first probabilities, and select a maximum probability of the first probabilities, a selection unit selecting a maximum-probability-transition path, a conversion unit converting the maximum-probability-transition path into a corresponding-transition-path corresponding to the second acoustic model, a calculation unit calculating a second probability of transition to the at-end-frame state on the corresponding-transition-path, and a finding unit finding to which word the input speech corresponds based on the maximum probability and the second probability.

14 Claims, 15 Drawing Sheets

(56) References Cited

U.S. PATENT DOCUMENTS

| | | | | |
|---|---|---|---|---|
| 5,799,277 | A | * | 8/1998 | Takami .................. 704/256.4 |
| 5,937,384 | A | * | 8/1999 | Huang et al. .............. 704/256 |
| 6,411,929 | B1 | * | 6/2002 | Ishiwatari et al. ......... 704/239 |
| 6,999,925 | B2 | * | 2/2006 | Fischer et al. ............ 704/243 |
| 7,139,688 | B2 | * | 11/2006 | Aggarwal et al. ............ 703/2 |
| 7,225,125 | B2 | * | 5/2007 | Bennett et al. ............ 704/233 |
| 7,542,949 | B2 | * | 6/2009 | Wren et al. ................ 706/16 |
| 2002/0049587 | A1 | * | 4/2002 | Miyazawa ................ 704/233 |
| 2002/0165717 | A1 | * | 11/2002 | Solmer et al. ............. 704/256 |
| 2003/0220791 | A1 | * | 11/2003 | Toyama .................. 704/256 |
| 2008/0201136 | A1 | * | 8/2008 | Fujimura et al. ........... 704/201 |

OTHER PUBLICATIONS

Jen-Tzung Chien; Chih-Hsien Huang; , "Bayesian learning of speech duration models," Speech and Audio Processing, IEEE Transactions on , vol. 11, No. 6, pp. 558-567, Nov. 2003.*

Proceedings of Mar., 2004 Spring Meeting of Acoustic Society of Japan, "*Spontaneous Speech Recognition Using Massively Parallel Decoder*", pp. 111-112.

* cited by examiner

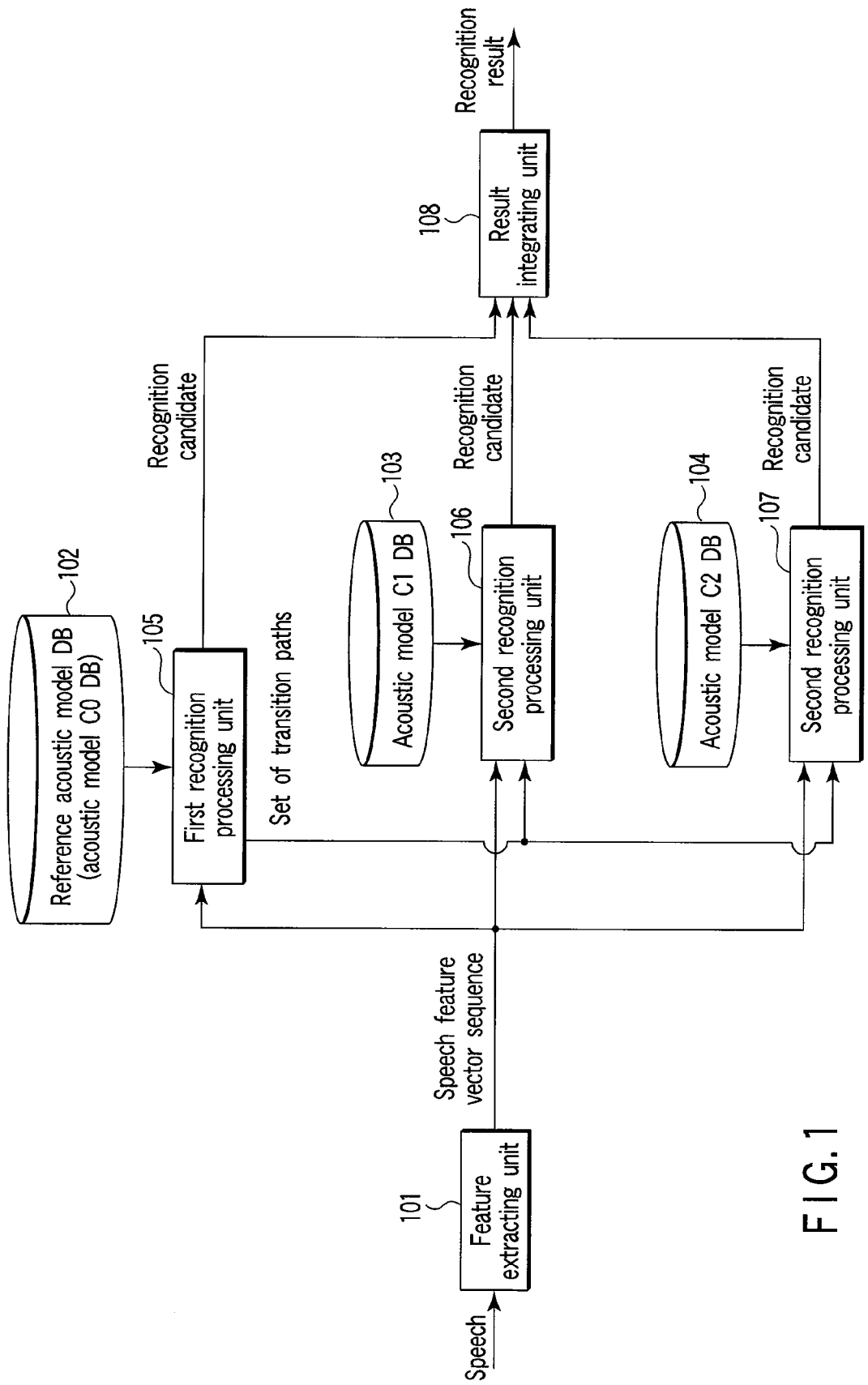
F I G. 1

Case of "male" speaker : utterance of category w1

| Category | Acoustic model C0 ("unspecified speaker") | Acoustic model C1 ("male") | Acoustic model C2 ("female") |
|---|---|---|---|
| w1 | 0.80 | 0.95 | 0.75 |
| w2 | 0.90 | 0.85 | 0.80 |

Case of "female" speaker : utterance of category w1

| Category | Acoustic model C0 ("unspecified speaker") | Acoustic model C1 ("male") | Acoustic model C2 ("female") |
|---|---|---|---|
| w1 | 0.80 | 0.75 | 0.95 |
| w2 | 0.90 | 0.80 | 0.85 |

F I G. 4

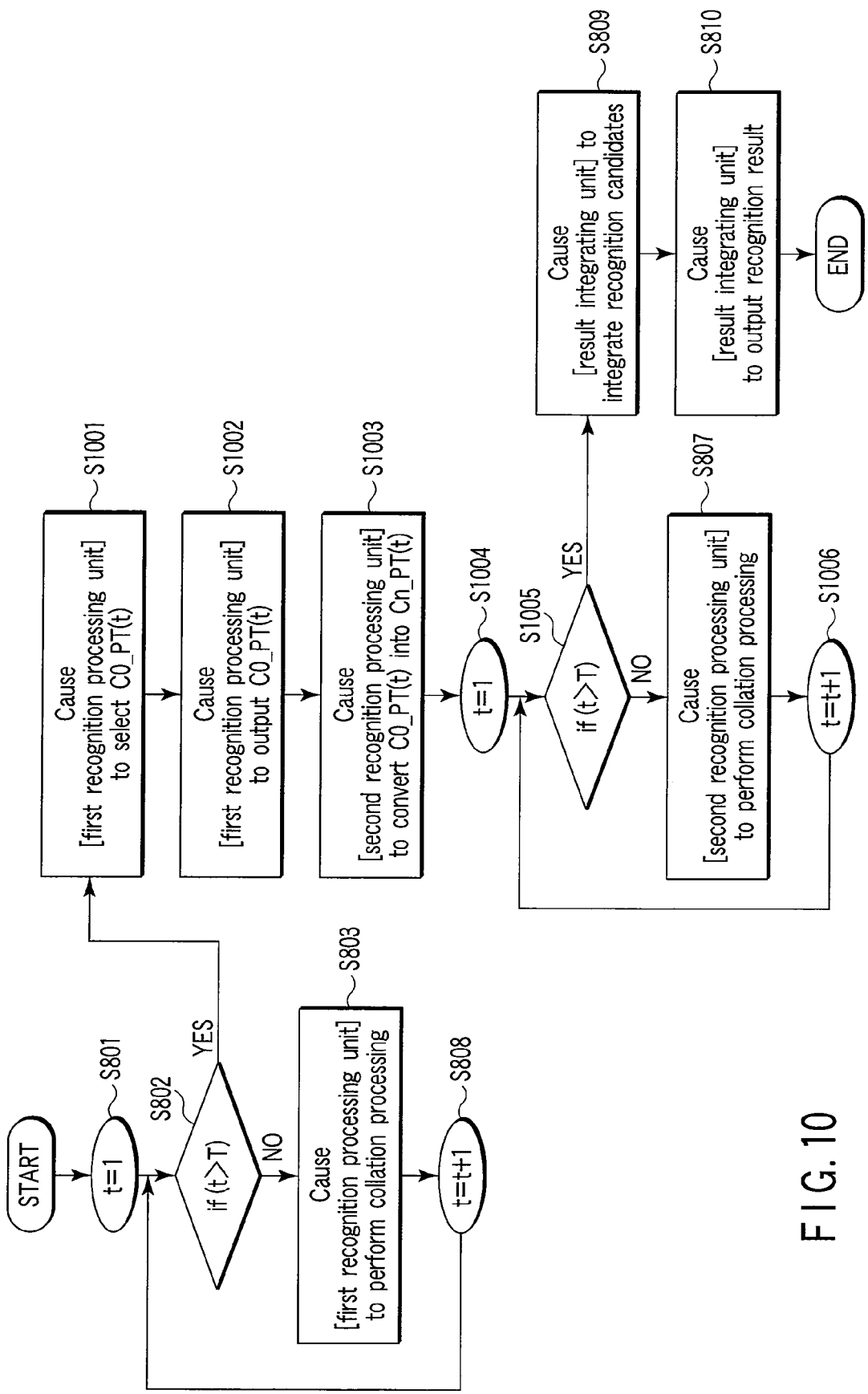
F I G. 10

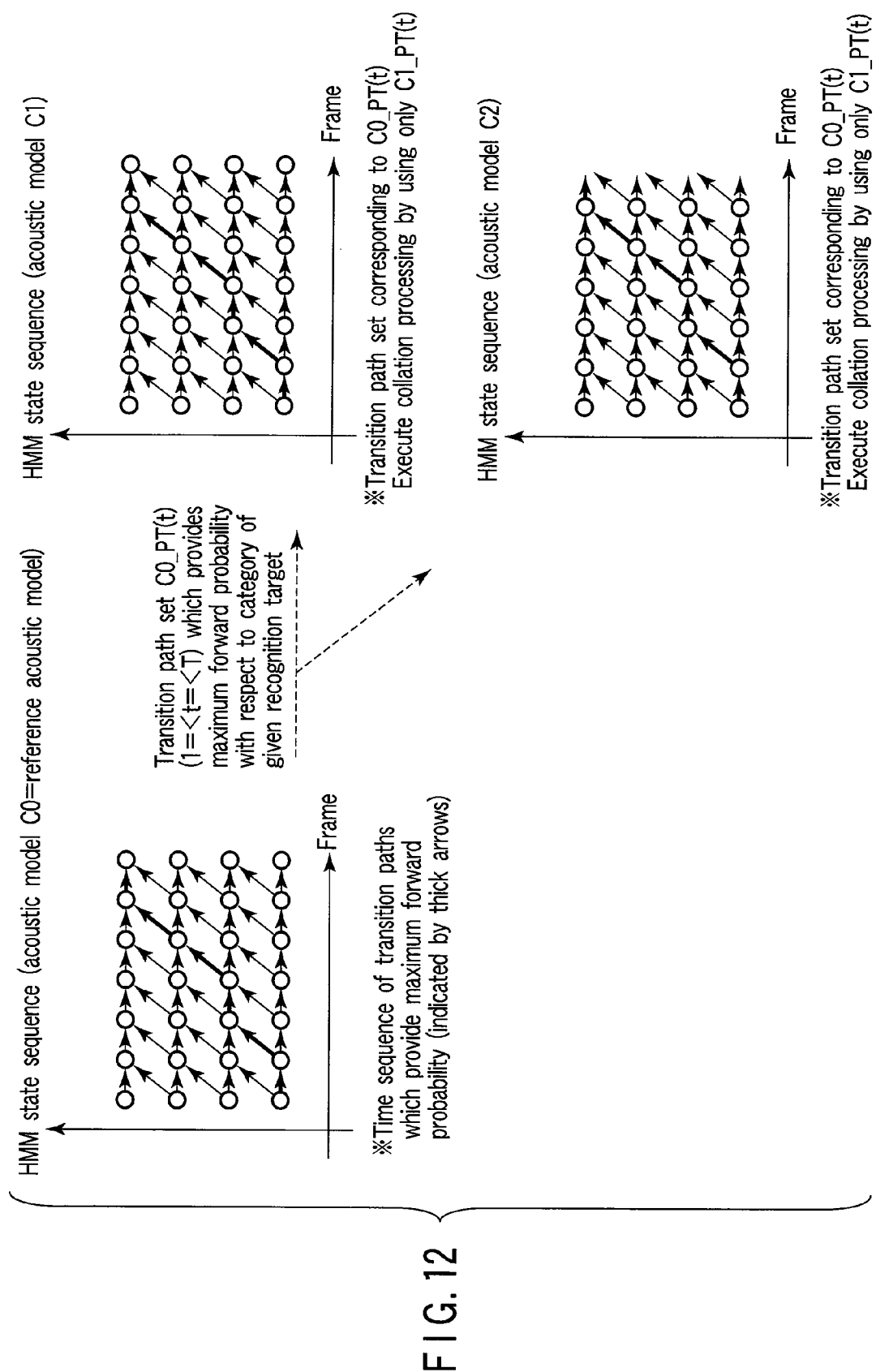
F I G. 12

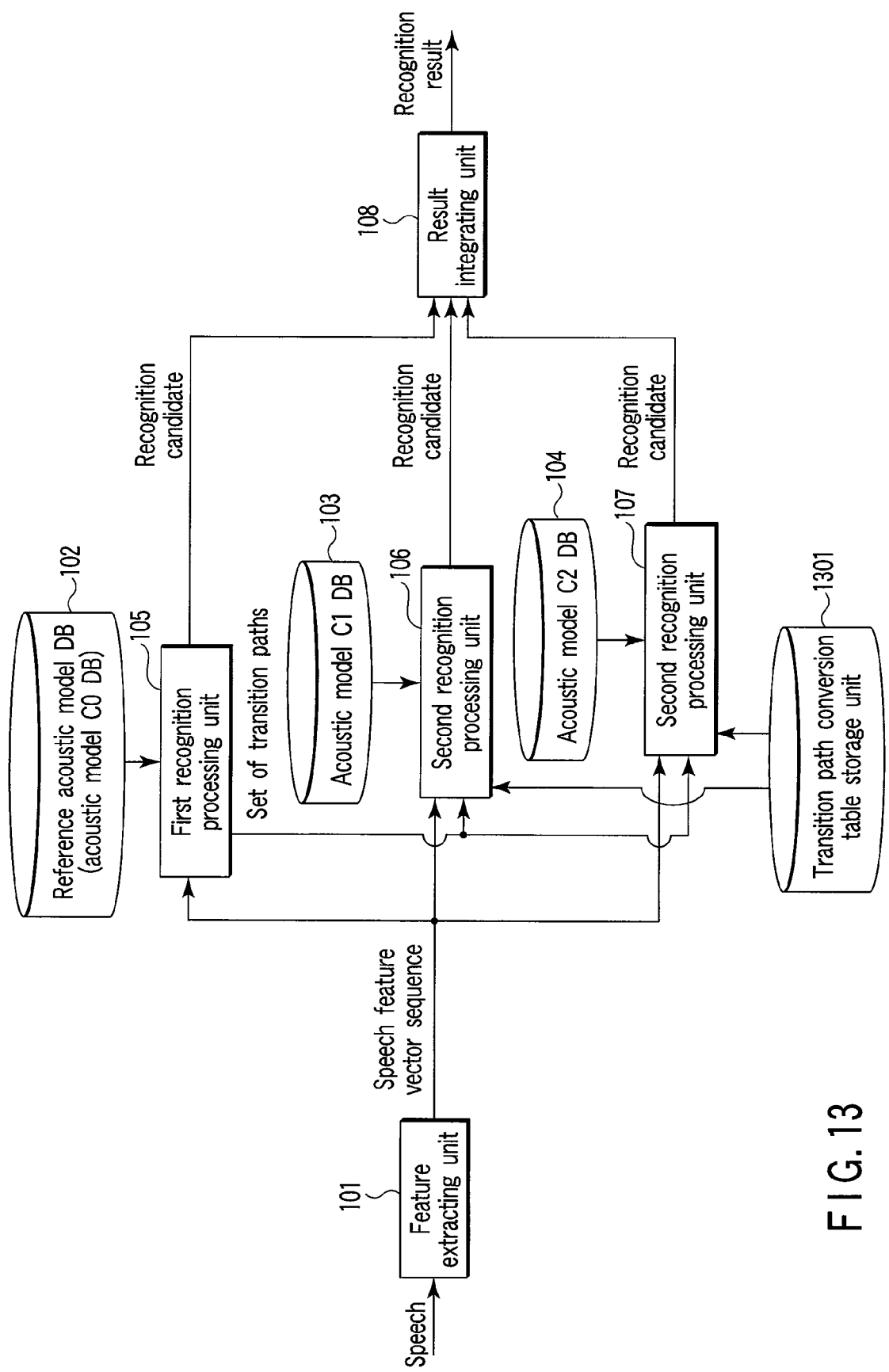
F I G. 13

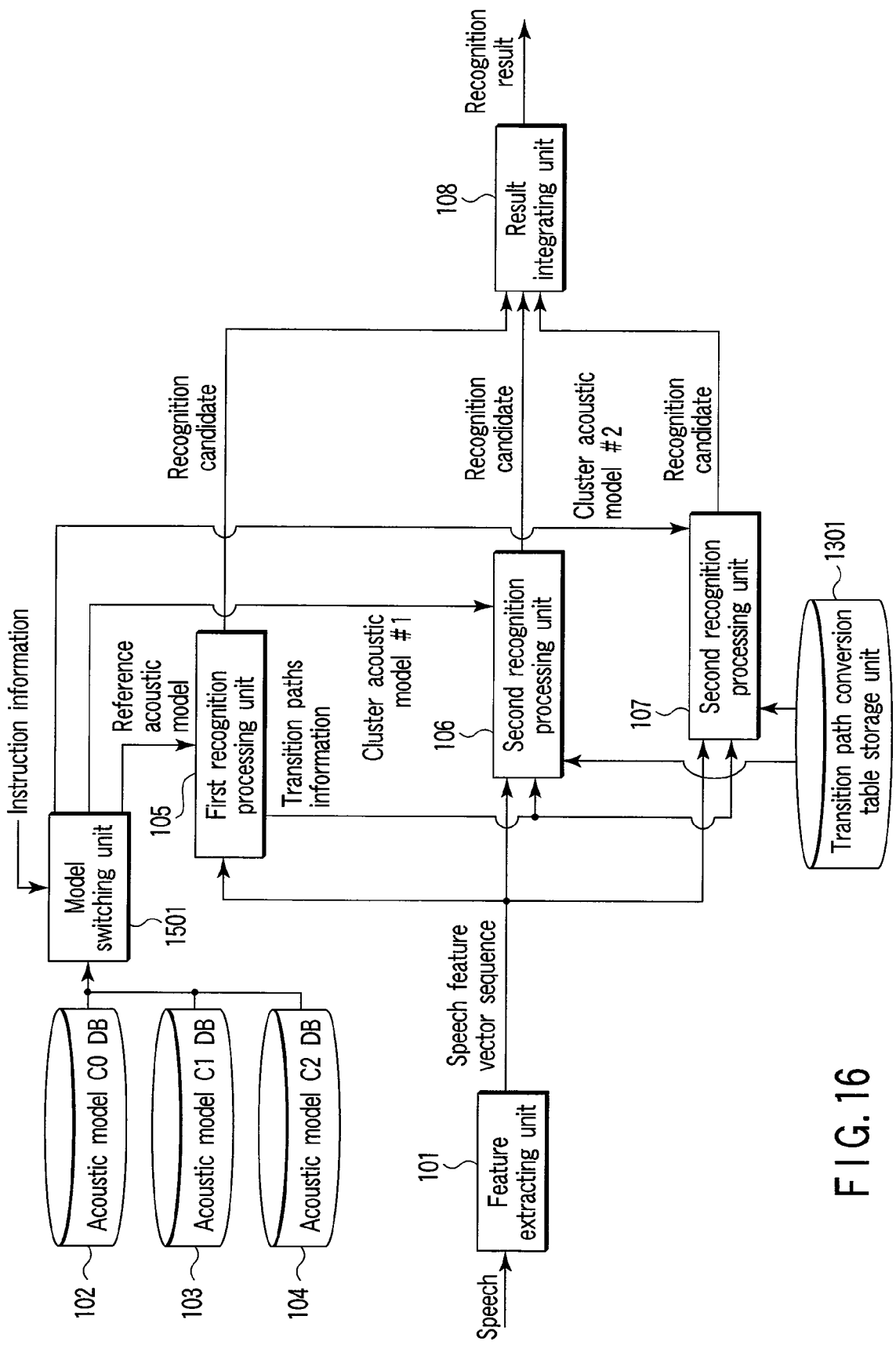
F I G. 16

SPEECH RECOGNITION APPARATUS AND METHOD AND PROGRAM THEREFOR

CROSS-REFERENCE TO RELATED APPLICATIONS

This application is based upon and claims the benefit of priority from prior Japanese Patent Application No. 2007-085698, filed Mar. 28, 2007, the entire contents of which are incorporated herein by reference.

BACKGROUND OF THE INVENTION

1. Field of the Invention

The present invention relates to a speech recognition apparatus and method and a program therefor, which perform collation processing by using a plurality of acoustic models.

2. Description of the Related Art

It is important for speech recognition to exhibit good performance with respect to speakers and utterance environments (ambient noise, classifications, SNRs, and the like). With regard to this point, there is known a technique of classifying speakers and utterance environments into a plurality of clusters, preparing acoustic models for the respective clusters, executing recognition processing by using each of these acoustic models, integrating a plurality of recognition processing results, and outputting the recognition result (see, for example, Shinozaki et al., "Spontaneous speech recognition using Massively Parallel Decoder", Proceedings of 2004 Spring Meeting of Acoustic Society of Japan, Feb. 11, 2006, pp. 111-112, March 2004). This technique performs recognition processing by using acoustic models corresponding to clusters classified according to speakers or utterance environments, and integrates the processing results. This can be expected to improve performance with respect to variations in speakers and utterance environments.

According to the conventional technique, however, acoustic models are prepared for the respective clusters, and recognition processing is executed by using the respective acoustic models. This increases the calculation cost required for recognition processing as compared with a case wherein one recognition process is executed by using one acoustic model. If, for example, N acoustic models are prepared for N clusters, respectively, and N recognition processes respectively using N acoustic models are executed, the calculation cost for the recognition processes increases N times. This poses a serious problem in an apparatus using speech recognition.

BRIEF SUMMARY OF THE INVENTION

In accordance with an aspect of the invention, there is provided a speech recognition apparatus comprising: a generating unit configured to generate a speech feature vector expressing a speech feature for each of a plurality of frames obtained by dividing an input speech between a start time and an end time and including frames from a start frame to an end frame; a first storage unit configured to store a first acoustic model obtained by modeling a speech feature of each word by using a state transition model including a plurality of states and a plurality of transition paths, each word being included in the input speech; a second storage unit configured to store at least one second acoustic model different from the first acoustic model; a first calculation unit configured to calculate, for each state, a first probability of transition to a state at the end frame for each word from the first acoustic model and a speech feature vector sequence from the start frame to the end frame to obtain a plurality of first probabilities for each word, and select a maximum probability of the first probabilities; a selection unit configured to select, for each word, a maximum probability transition path corresponding to the maximum probability, the maximum probability transition path indicating transition from a start state at the start frame to an end state at the end frame; a conversion unit configured to convert, for each word, the maximum probability transition path into a corresponding transition path corresponding to the second acoustic model; a second calculation unit configured to calculate, for each word, a second probability of transition to the state at the end frame on the corresponding transition path from the second acoustic model and the speech feature vector sequence; and a finding unit configured to find to which word the input speech corresponds based on the maximum probability for each word and the second probability for each word.

BRIEF DESCRIPTION OF THE SEVERAL VIEWS OF THE DRAWING

FIG. 1 is a block diagram of a speech recognition apparatus according to the first embodiment;
FIG. 4 is a view showing an effective example of an integration result from a result integrating unit in FIG. 1;
FIG. 10 is a flowchart showing an example of the operation of the speech recognition apparatus in FIG. 1;
FIG. 12 is a view showing a transition path conversion technique in a first recognition processing unit in the third embodiment;
FIG. 13 is a block diagram showing a speech recognition apparatus according to the fourth embodiment;
FIG. 16 is another block diagram of the speech recognition apparatus according to the fifth embodiment.

DETAILED DESCRIPTION OF THE INVENTION

Figure 2:
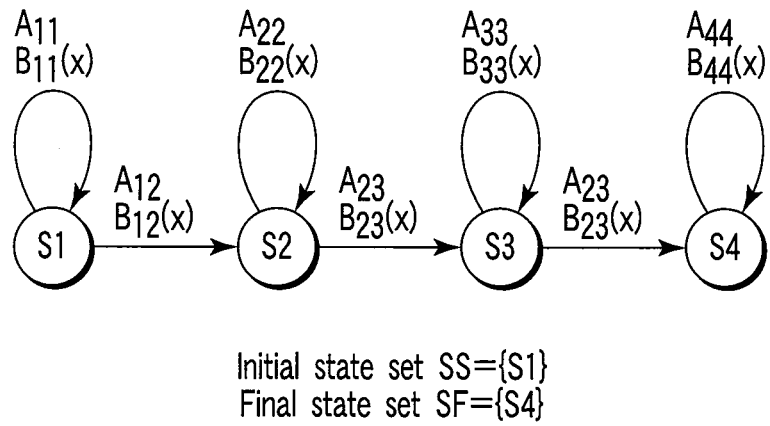
FIG. 2 is a view showing an example of an HMM.

A speech recognition apparatus and method and a program therefor according to embodiments will be described below with reference to the views of the accompanying drawing.

The speech recognition apparatus and method and the program therefor can efficiently reduce the calculation cost required for recognition processing without affecting recognition performance.

First Embodiment

FIG. 1 is a block diagram showing an example of the arrangement of a preferred speech recognition apparatus according to the first embodiment.

The speech recognition apparatus in FIG. 1 comprises a feature extracting unit 101, reference acoustic model database 102, acoustic model C1 database 103, acoustic model C2 database 104, first recognition processing unit 105, second recognition processing units 106 and 107, and result integrating unit 108. Note that FIG. 1 shows an example of the apparatus including two second recognition processing units. The second recognition processing units 106 and 107 perform collation processes (to be described later) by using the acoustic model C1 database 103 and the acoustic model C2 database 104, respectively. The first embodiment and other embodiments can take an example arrangement in which the numbers of second recognition processing units and acoustic models which they use are increased in accordance with the number of clusters (to be described later), as well as the example shown in FIG. 1. That is, the embodiments can execute the present invention upon setting the total numbers of second recognition processing units and acoustic models which they use to an arbitrary number equal to or more than one.

The feature extracting unit 101 generates a time sequence $X(t)=(x(1), x(2), \ldots, x(T))$ of speech feature vectors from an input speech signal for each frame having a given time width. $X(t)$ is also called a speech feature vector sequence. In this case, $x(t)$ represents a speech feature vector at tth frame t. Note, however, that $1 \leq t \leq T$ where $t=1$ corresponds to the start position of the input speech (the start time of the input speech) for which recognition processing is executed and $t=T$ corresponds to the end position of the input speech (the end time of the input speech) for which recognition processing is executed. A speech feature vector is a vector having a one-dimensional or higher-dimensional element, and expresses a speech feature at frame t. An example of such a speech feature vector is an MFCC vector.

MFCC is a technique of obtaining a speech feature vector by performing cepstrum analysis of extracting a low-order component from a speech spectrum at frame t by calculating the logarithmic value of a mel-filter bank output and applying DCT to the logarithmic value. Note, however, that the first and other embodiments can use an arbitrary speech feature vector other than an MFCC vector as a speech feature vector in the feature extracting unit 101.

The reference acoustic model database 102, acoustic model C1 database 103, and acoustic model C2 database 104 are obtained by modeling the acoustic features of categories as recognition targets for the respective categories. For the sake of descriptive convenience, the reference acoustic model database 102 is sometimes simply called an "acoustic model C0 DB 102". When the reference acoustic model database 102, acoustic model C1 database 103, and acoustic model C2 database 104 are commonly described, they are collectively and simply called an "acoustic model" hereinafter. The acoustic model will be described in more detail later in the item of "Acoustic Model".

The first recognition processing unit 105 collates an acoustic feature vector sequence output from the feature extracting unit 101 with the acoustic models contained in the acoustic model C0 DB 102. That is, the first recognition processing unit 105 calculates an output probability $P(X|w, C0)$ of the acoustic feature vector sequence $X(t)$ from an HMM (Hidden Markov Model) provided with a given category w. In this case, $1 \leq w \leq W$ where W is the total number of categories as recognition targets. In this case, the category w corresponds to speech which can be modeled by an HMM, and is, for example, a sentence or a word. An output probability from an HMM provided with the category w will be described in more detail later in the item of "Output Probability from HMM".

The first recognition processing unit 105 selects several transition paths for each frame from a set C0_PTall of all transition paths which are referred to in the calculation of the forward probability of an HMM at frame t, and outputs the selected transition paths to the second recognition processing units 106 and 107. That is, the first recognition processing unit 105 selects, for each frame, a set C0_PT(t) of transition paths of the acoustic model C0 DB 102 which is a subset of C0_PTall. A selection technique will be described later in "Transition Path Set Selection Technique". Note that a forward probability is represented by $\alpha(i, t)$ as will be described later.

The second recognition processing units 106 and 107 respectively perform collation processing between a speech feature vector sequence and the acoustic model C1 database 103, and collation processing between a speech feature vector sequence and the acoustic model C2 database 104. That is, the second recognition processing units 106 and 107 calculate probabilities $P(X|w, C1)$ and $P(X|w, C2)$ from an HMM provided with a given category w. In the following description, these output probabilities are collectively written as $P(X|w, Cn)$, and are more simply written as $P(X|Cn)$. In this case, however, $n=1, 2$. The second recognition processing units will be described in detail later in "Second Recognition Processing Unit".

The result integrating unit 108 integrates recognition candidates output from the first recognition processing unit 105 and the second recognition processing units 106 and 107, and outputs a recognition result as the overall speech recognition apparatus. An integration technique will be described in detail later in "Integration Technique".

(Acoustic Model)

Acoustic models are those obtained by modeling the speech features and acoustic features of categories as recognition targets for the respective categories. Such an acoustic model is preferably a model having a state transition for the proper modeling of a time-series change in an acoustic feature. An HMM can be used as a model having a state transition suitable for speech recognition. An HMM is defined by one or more states Si, an initial state set SS, a final state set SF, a probability Aji of transition from a given state Sj to another state Si, an output probability $Bji(x)$ of a speech feature vector x in the transition path from the state Sj to the state Si, and an initial probability PSi of the state Si. Note, however, that $1 \leq i \leq NS$ and $1 \leq j \leq NS$, where NS is the total number of states constituting an HMM.

FIG. 2 shows an example of an HMM. FIG. 2 shows an example of an HMM defined by state count $NS=4$, initial state set $SS=\{S1\}$, and final state set $SF=\{S4\}$. FIG. 2 does not illustrate any transition path whose transition probability and output probability have no significant values, i.e., any transition path whose transition probability and output probability are always 0. The HMM in FIG. 2 is an example of an HMM typically used in speech recognition. That is, this is an example of an HMM which has a so-called Left-to-Right topology, and in which the initial state set SS and the final state set SF each have an element count of 1, and the transition probability Aji and output probability $Bji(x)$ are significant only on a transition path $(j, i)$ where $I=j$ or $i=j+1$. In this case, a topology is a structure indicating the self-transition of each state (self-loop) and transition paths between the respective states. The example in FIG. 2 shows a structure comprising states and paths excluding the transition probability Aji and the output probability $Bji(x)$.

Figure 3:
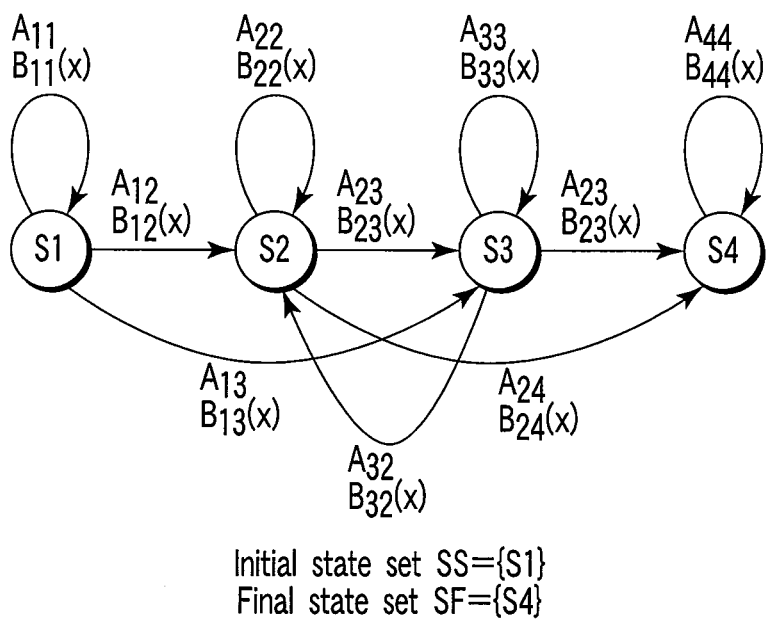
FIG. 3 is a view showing an example of an HMM.

The following description is based on the assumption that the HMM shown in FIG. 2 is used as an acoustic model. Note that the first and other embodiments can use all types of HMMs including the example in FIG. 2 as acoustic models. For example, the embodiments can use an HMM having many transition paths like the example shown in FIG. 3. In addition, the embodiments can use an arbitrary model having a state transition like a time series template model as well as an HMM.

An acoustic model corresponds to one of sets (clusters) obtained from speakers, environment variations, and the like as classification criteria, and is trained by using speech data belonging to the corresponding cluster. As a classification criterion for the formation of such a cluster, it is possible to use, for example, a sex (male or female), an age group (adult, juvenile, or aged), a type of ambient noise, or the SNR of ambient noise. It is possible to arbitrarily determine such a classification criterion when learning an acoustic model. It is also possible to combine a plurality of classification criteria. In addition, it suffices to determine classification criteria such that given speech data belongs to a plurality of clusters. If, for example, a sex and an age group are set as classification criteria, six types of clusters can be generated, namely "male and adult", "male and juvenile", "male and aged", "female and adult", "female and juvenile", and "female and aged". Given speech data belongs to one of these six types of clusters. Alternatively, these two classification criteria may be independently used to generate five types of clusters, namely "male", "female", "adult", "juvenile", and "aged". In this case, speech data belonging to the clusters "male" and "female" also belongs to any of the clusters "adult", "juvenile", and "aged". In this manner, clusters may be generated such that a plurality of clusters share part of speech data. Furthermore, clusters may be generated such that a given cluster includes another cluster, like three types of clusters "unspecified speaker", "male", and "female".

Assume that in the first embodiment, a cluster including some or all of other clusters is selected as a cluster corresponding to the reference acoustic model database 102, i.e., the acoustic model C0 DB 102. Assume also that clusters which share part of speech data with the cluster corresponding to the acoustic model C0 DB 102 or are included by it are selected as clusters corresponding to the acoustic model C1 database 103 and the acoustic model C2 database 104. An example of such a cluster group is three types of clusters, namely "unspecified speaker", "male", and "female" described above. In this case, the cluster "unspecified speaker" is a cluster to which the speech data of all speakers belong, and includes the clusters "male" and "female". The cluster "male" is a cluster to which the speech data of a male speaker belongs. The cluster "female" is a cluster to which the speech data of a female speaker belongs. These clusters are exclusive to each other.

Assume that in the first embodiment, the acoustic model C0 DB 102, acoustic model C1 database 103, and acoustic model C2 database 104 are made to correspond to these three types of clusters, i.e., the cluster "unspecified speaker", the cluster "male speaker", and the cluster "female speaker", respectively. Note, however, that the first embodiment and other embodiments have no limitation on the selection of clusters corresponding to acoustic models, and can make arbitrary clusters correspond to acoustic models.

(Output Probability from Hmm)

If the output probability $P(X|w, C0)$ from an HMM provided with a given category w is simplified as $P(X|C0)$, $P(X|C0)$ is calculated by equations (1), (2), and (3) given below:

$$P(X|C0) = \max\_i(C0\_\alpha(i,t)) \quad (1)$$

for $C0\_Si \subset C0\_SF$ $$C0\_\alpha(i,0) = C0\_PSi \quad (2)$$

for $C0\_Si \subset C0\_SS$ $$Cn\_\alpha(i,t) = \max\_i(C0\_Aji * C0\_Bji(x(t)) * C0\_\alpha(j,t-1)) \quad (3)$$

for $(j, i) \subset C0\_PTall$ where "C0_" is a prefix indicating that each term of equations (1), (2), and (3) depends on the acoustic model C0 DB 102. This prefix has the same meaning with respect to other terms and symbols. In the following description, this prefix is omitted unless necessary. The description of terms and symbols with the omission of prefixes is common to the acoustic model C0 DB 102, the acoustic model C1 database 103, and the acoustic model C2 database 104.

In equations (1), (2), and (3), $\alpha(i, t)$ represents the forward probability that the initial state of the HMM transitions to the state Si at frame t. Since the HMM includes a plurality of transition paths through which the initial state reaches the state Si at frame t, the forward probability is basically calculated as the total sum of forward probabilities for a plurality of transition paths. According to equation (3), however, one of a plurality of transition paths which provides the maximum forward probability is selected, and the forward probability for the selected path is set as the forward probability of the state Si at frame t. This method is called the Viterbi method. It is known in the field of speech recognition that the Viterbi method is a good approximation of the method of calculating the total sum of forward probabilities for a plurality of transition paths. In addition, in equation (3), PTall represents a set of all transition paths of the HMM which are referred to in the calculation of a forward probability.

(Second Recognition Processing Unit)

The technique used in the second recognition processing unit will be described in comparison with a conventional technique.

According to the conventional technique, the second recognition processing unit calculates the output probability $P(X|Cn)$ according to equations (4), (5), and (6):

$$P(X|w,Cn) = \max\_i(Cn\_\alpha(i,T)) \quad (4)$$

for $Cn\_Si \subset Cn\_SF$ $$Cn\_\alpha(i,0) = Cn\_PSi \quad (5)$$

for $Cn\_Si \subset Cn\_SS$ $$Cn\_\alpha(i,t) = \max\_i(Cn\_Aji * Cn\_Bji(x(t)) * Cn\_\alpha(j,t-1)) \quad (6)$$

for $(j, i) \subset Cn\_PTall$ where "Cn_" is a prefix indicating that each term of equations (4), (5), and (6) depends on an acoustic model Cn (n=1, 2). Equations (4), (5), and (6) are identical to equations (1), (2), and (3), respectively, except for whether or not they have terms depending on the acoustic model C0 DB 102.

Collation processing by the second recognition processing units 106 and 107 in the first embodiment will be described in comparison with the above technique. First of all, the second recognition processing units 106 and 107 convert the set C0_PT(t) of transition paths of the acoustic model C0 DB 102 output from the first recognition processing unit 105 into a set C1_PT(t) of transition paths of the acoustic model C1 database 103 and a set C2_PT(t) of transition paths of the acoustic model C2 database 104, respectively. As a conversion technique, there is available a technique of defining the acoustic model C0 DB 102, acoustic model C1 database 103, and acoustic model C2 database 104 as HMMs having the same topology, and converting the transition paths into transition paths located at the same positions. Note that the technique of converting the set C0_PT(t) of transition paths into the sets C1_PT(t) and C2_PT(t) in the second recognition processing units 106 and 107 will be described in detail later in "Transition Path Conversion Technique".

The second recognition processing units 106 and 107 in the first embodiment calculate the output probability P(X|Cn) by using equation (7) in place of equation (6) in the conventional technique described above.

$$Cn\_\alpha(i,t) = \max\_i(Cn\_Aji * Cn\_Bji(x(t)) * Cn\_\alpha(j,t-1)) \quad (7)$$

for (j, i) ⊂ Cn_PT(t)

Let #Cn_PT(t) and #Cn_PTall be the total numbers of transition paths included in Cn_PT(t) and Cn_PTall (n=1, 2). In this case, if #Cn_PT(t)<#Cn_PTall, the number of times of calculation "Cn_Aji*Cn_Bji(x(t))*Cn_α(j, t−1)" for a forward probability for each transition path in the right-hand side of equation (7) is smaller than that in the case of equation (6). That is, the number of times of calculation for a forward probability in the second recognition processing units 106 and 107 can be reduced by making the first recognition processing unit 105 properly select the set C0_PT(t) of transition paths of the acoustic model C0 DB 102 and letting Cn_PT(t) converted from C0_PT(t) in the second recognition processing units 106 and 107 satisfy #Cn_PT(t)<#Cn_PTall (n=1, 2). That is, as compared with the conventional technique represented by equation (6), the first embodiment which is represented by equation (7) can reduce the calculation cost.

Since Cn_PT(t) converted from C0_PT(t) in the second recognition processing units 106 and 107 is a transition path which provides a higher forward probability than other transition paths in collation processing using the acoustic model C0 DB 102 in the first recognition processing unit 105, it is highly possible that the corresponding transition path Cn_PT(t) is also a transition path which provides a higher forward probability than other transition paths in collation processing using the acoustic model C1 database 103 and acoustic model C2 database 104 in the second recognition processing units 106 and 107. The reason will be described below.

The acoustic model C0 DB 102 is trained by speech data belonging to the cluster "unspecified speaker". The cluster "unspecified speaker" is a cluster to which all speech data belonging to the cluster "male" and the cluster "female" belong. The cluster "unspecified speaker" includes the cluster "male" and the cluster "female". Since the acoustic model C0 DB 102 is trained by speech data partly common to the acoustic model C1 database 103 and the acoustic model C2 database 104, the property of the acoustic model C0 DB 102 is considered partly common to them. In addition, as described above, since an acoustic model is obtained by modeling a time-series change in an acoustic feature, transition paths corresponding to each other between the acoustic model C0 DB 102, the acoustic model C1 database 103, and the acoustic model C2 database 104 correspond to the same time position in the input speech, and is considered to be obtained by modeling a fluctuation in an acoustic feature for each cluster at the time position. Therefore, transition paths of the acoustic model C0 DB 102, acoustic model C1 database 103, and acoustic model C2 database 104 which provide maximum forward probabilities with respect to given input speech are expected to be common between the acoustic models. Cn_PT(t) converted from C0_PT(t) by the second recognition processing units 106 and 107 is likely to be a transition path which provides a higher forward probability than other transition paths in collation processing by the second recognition processing units 106 and 107. For this reason, collation processing by the second recognition processing units 106 and 107 according to the first embodiment can be expected to be a good approximation of collation processing by the conventional technique.

(Integration Technique)

As a technique of integrating results output from the respective recognition processing units, there is available a technique of referring to all output probabilities P(X|w, Cn) (1≦w≦W, n=0, 1, 2) calculated by the first recognition processing unit 105 and the second recognition processing units 106 and 107 and outputting a category w which provides the maximum output probability among them as a recognition result. The performance improving effect achieved by this result integration technique will be described with reference to FIG. 4.

FIG. 4 shows an example of an output probability calculated with each acoustic model in a case wherein a "male" speaker or a "female" speaker makes an utterance corresponding to a category w1. In the case of a "male" speaker, an output probability P(X|w1, C1) calculated by using the acoustic model C1 database 103 is maximum and larger than output probabilities P(X|w1, C0) and P(X|w1, C2) calculated by using other acoustic models. In this case, the output probability P(X|w1, C0) or P(X|w1, C2) calculated by using the acoustic model C0 DB 102 or the acoustic model C2 database 104 trained by speech data belonging to the cluster "unspecified" or the cluster "female" is smaller in value than P(X|w2, C0) or P(X|w2, C2). That is, the recognition result from the speech recognition apparatus which separately uses these acoustic models becomes an error.

In contrast, in the case of a "female" speaker, the output probability P(X|w1, C2) calculated by using the acoustic model C2 database 104 trained by acoustic data belonging to the cluster "female" is maximum. In this manner, the result integrating unit 108 integrates a plurality of recognition candidates output from a plurality of recognition processing units using a plurality of acoustic models and outputs a recognition result, thereby improving the performance of the speech recognition apparatus.

As techniques of integrating results in the result integrating unit 108, various other techniques are conceivable. For example, there is available a technique of calculating the total sums of three types of output probabilities respectively calculated by the first recognition processing unit 105 and the second recognition processing units 106 and 107 and outputting a category w which provides the maximum total sum as a recognition result. In addition, there is also available a technique of calculating the differences between the above three types of output probabilities, excluding a category from recognition candidates when the absolute value of a corresponding difference becomes smaller than a given threshold, and outputting a category w which provides the maximum output probability as a recognition result. As described above, various techniques are conceivable as result integration techniques in the result integrating unit 108. The first embodiment and other embodiments have no limitation on the result integration technique to be used in the result integrating unit, and any technique can be used.

(Transition Path Set Selection Technique)

According to a selection technique, when calculating a forward probability on the basis of equation (3), the first recognition processing unit 105 selects a transition path which provides a higher forward probability than other transition paths. Such a transition path is likely to be a transition path which provides the left-hand side of equation (3), i.e., a transition path which provides the forward probability of a state Si. A technique of selecting the transition path set C0_PT(t) in the first recognition processing unit 105 will be described below.

As a technique of selecting the transition path set C0_PT(t) in the first recognition processing unit 105, there is available a technique of selecting a transition path which provides the maximum forward probability for each HMM state of the acoustic model C0 DB 102. The technique of selecting the transition path set C0_PT(t) in the first recognition processing unit 105 will be described below with reference to FIGS. 5 and 6.

Figure 5:
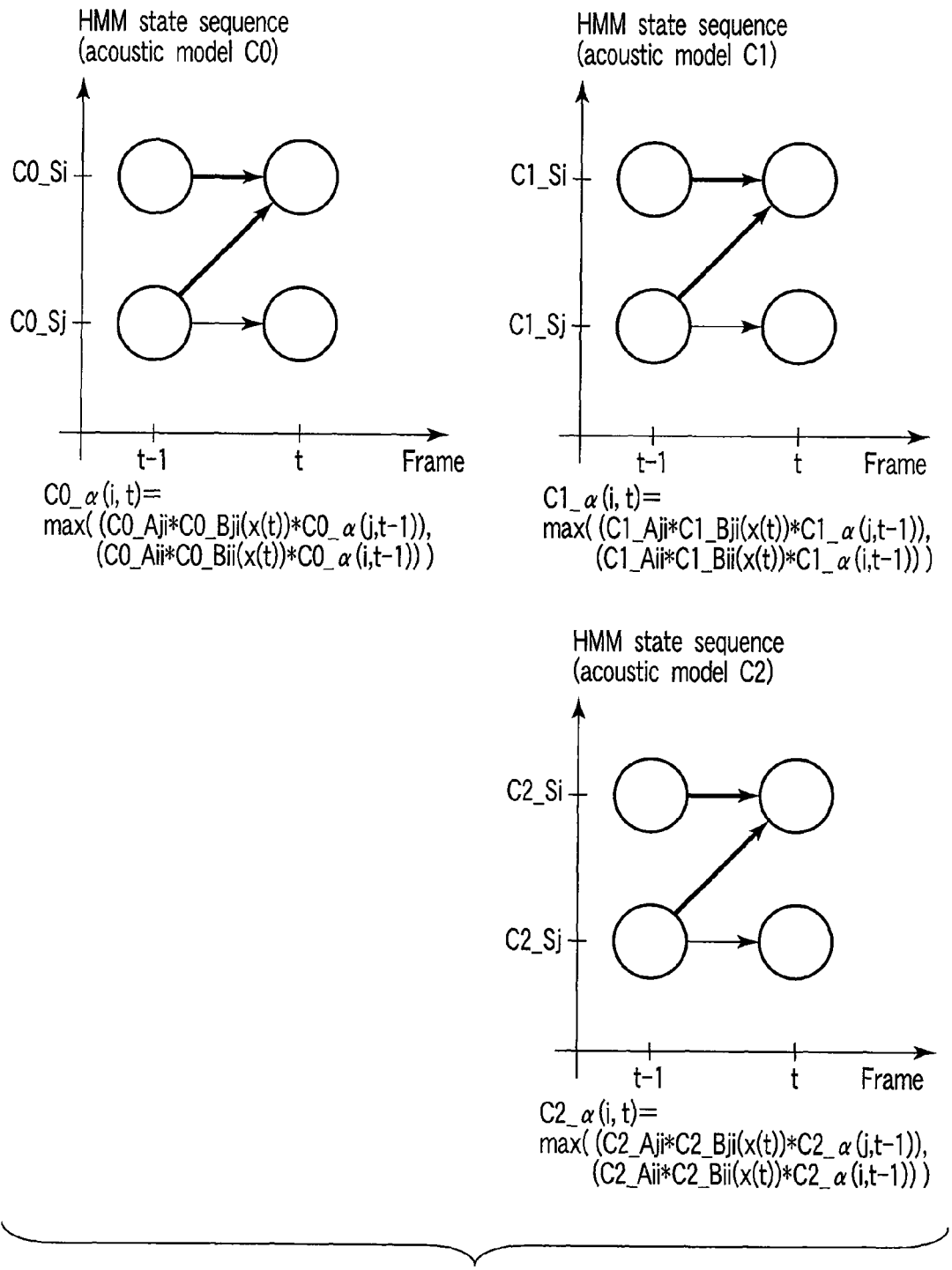
FIG. 5 is a view showing conventional calculation techniques in units corresponding to first and second recognition processing units in FIG. 1.
Figure 6:
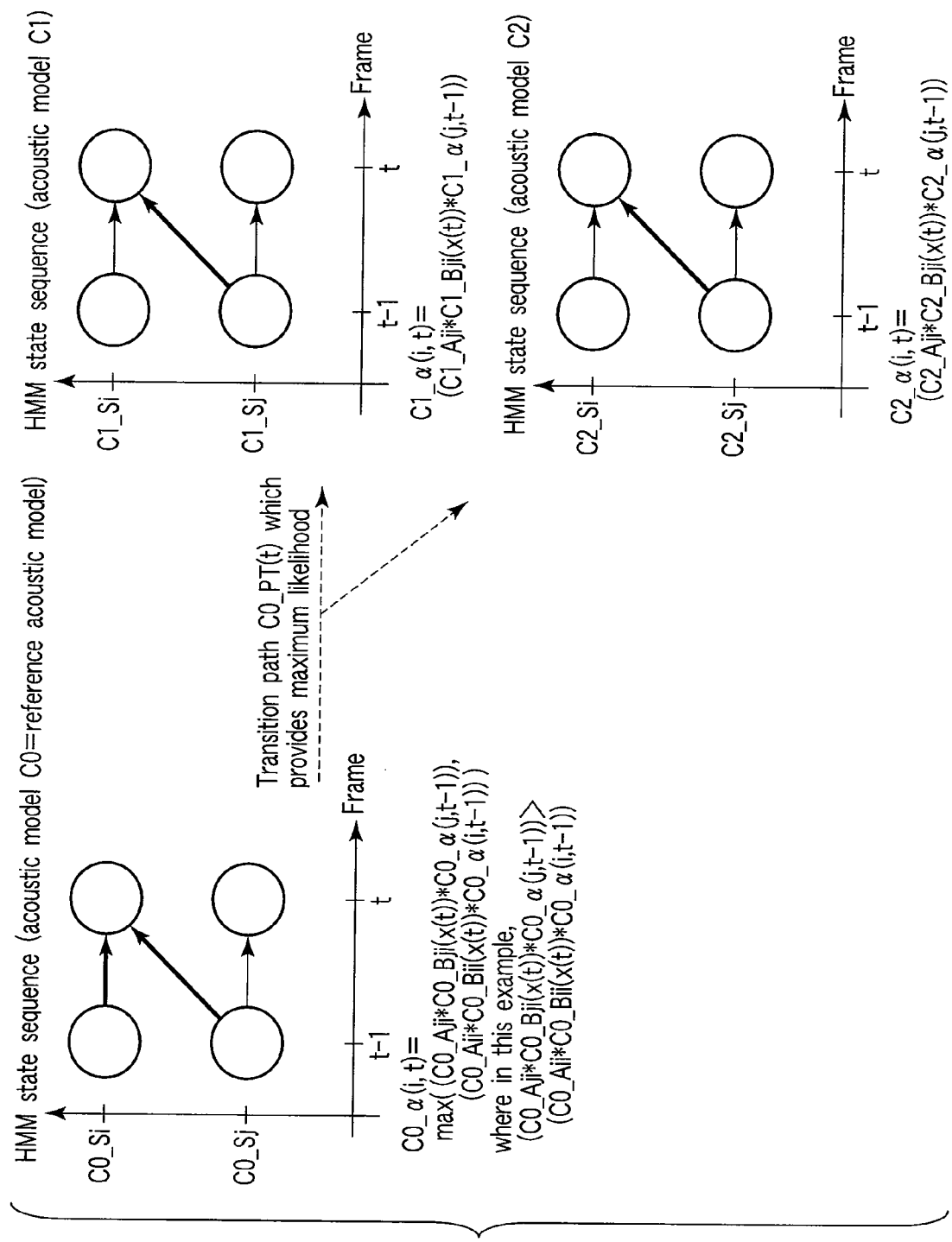
FIG. 6 is a view showing calculation techniques in the first and second recognition processing units in FIG. 1.

FIGS. 5 and 6 show part of a forward probability calculation technique in a case wherein the Left-to-Right HMM exemplified by FIG. 2 is used as an acoustic model. FIG. 5 exemplifies a calculation procedure in the conventional technique. FIG. 6 shows a calculation procedure in the first embodiment. Both FIGS. 5 and 6 show cases wherein there are two transition paths to the state Si of the HMM, i.e., a transition from the state Sj and a transition (self-loop) from the state Si.

In the example of the conventional technique, in collation processing using the acoustic model C0 DB 102, acoustic model C1 database 103, and acoustic model C2 database 104, the forward probability of a state Cn_Ci (n=1, 2, 3) at frame t is calculated by referring to all transition paths which can transition to a state Cn_Si. In the example shown in FIG. 5, a total of six transition paths (indicated by the thick arrows in FIG. 5) are referred to in the calculation of a forward probability. In collation processing in the conventional technique, this procedure is sequentially executed in all states and at all frames.

In contrast to this, in the example of the first embodiment shown in FIG. 6, first of all, the first recognition processing unit 105 executes collation processing by using the acoustic model C0 DB 102. The first recognition processing unit 105 then selects one transition path which provides the maximum forward probability in the calculation of the forward probability of the state C0_Si at frame t, and adds it to the transition path set C0_PT(t). In the example shown in FIG. 6, a transition path from the state C0_Sj to the state C0_Si is selected. In collation processing in the first recognition processing unit 105, this procedure is sequentially executed for all states and at all frames to proceed with collation processing in the first recognition processing unit 105. At the same time, the first recognition processing unit 105 selects the transition path set C0_PT(t) and outputs it to the second recognition processing units 106 and 107.

The second recognition processing units 106 and 107 convert the transition path set C0_PT(t) into C1_PT(t) and C2_PT(t), and execute collation processing by referring to only transition paths belonging to the transition path sets C1_PT(t) and C2_PT(t), respectively. In collation processing, when calculating the forward probability of the state Cn_Si (n=1, 2) at frame t, the second recognition processing units 106 and 107 refer to only the transition paths from the state Cn_Sj to the state Cn_Si. This allows to refer to only a total of four transition paths (indicated by the thick arrows in FIG. 6) in the calculation of a forward probability. That is, as compared with the conventional technique shown in FIG. 5, the first embodiment exemplified by FIG. 6 can reduce the number of times of calculation of forward probabilities in collation processing in the second recognition processing units 106 and 107 by two. As described above, since this procedure is sequentially executed for all states and at all frames, the number of times of calculation of forward probabilities which can be reduced becomes larger in proportion to the numbers of states and frames. This makes it possible to reduce the calculation cost required for collation processing in the second recognition processing units 106 and 107.

As described above, a transition path which provides the maximum forward probability in collation processing using the acoustic model C0 DB 102 can be considered as a good approximation of a transition path which provides the maximum forward probability in collation processing using the acoustic model C1 database 103 and the acoustic model C2 database 104. That is, according to the first embodiment, it is possible to reduce the calculation cost required for collation processing without affecting the performance as compared with the conventional technique.

(Transition Path Conversion Technique)

Figure 7:
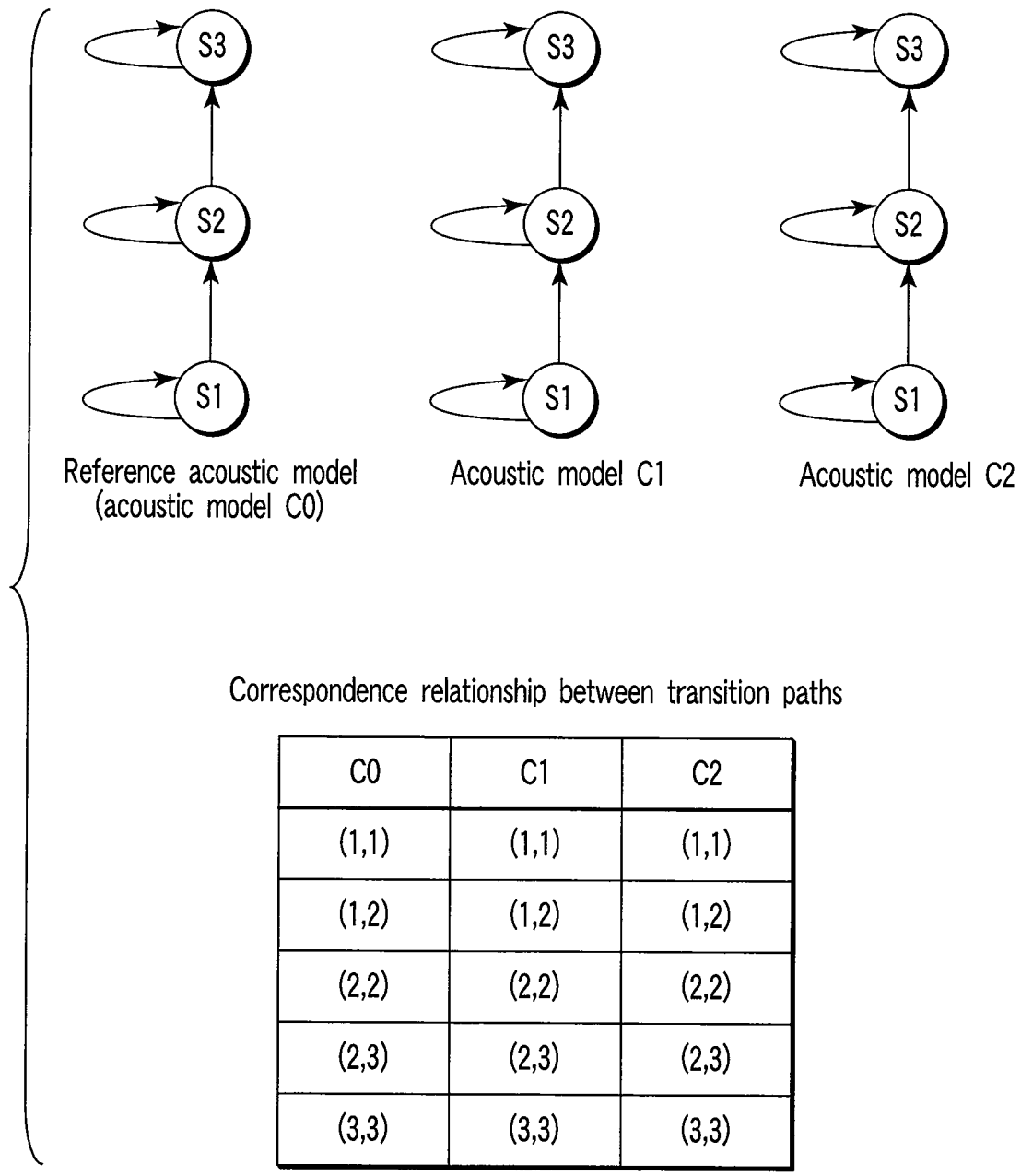
FIG. 7 is a view showing a transition path conversion technique in the second recognition processing unit in FIG. 1.

Only the technique of converting the transition path set C0_PT(t) into C1_PT(t) and C2_PT(t) in the second recognition processing units 106 and 107 will be described below with reference to FIG. 7.

In the first embodiment, each category as a recognition target is modeled by using HMMs having the same topology with the acoustic model C0 DB 102 used by the first recognition processing unit 105 and the acoustic model C1 database 103 and acoustic model C2 database 104 used by the second recognition processing units 106 and 107. That is, for all acoustic models, HMMs having the same state count and the same transition paths are used for each category. FIG. 7 exemplifies HMMs having the same topology. In the case shown in FIG. 7, the three models each have three states, with the self-loops in the respective states (i.e., S1, S2, and S3) and the start and end points of transition paths showing the same correspondence. As is obvious from FIG. 7, among a plurality of HMMs having the same topology, the transition paths of a given HMM can be easily made to one-to-one correspond to the transition paths of another HMM. That is, it is possible to convert an arbitrary transition path (j, i) of the acoustic model C0 DB 102 into a transition path (j, i) of the acoustic model C1 database 103 or a transition path (j, i) of the acoustic model C2 database 104. Conversion in the case shown in FIG. 7 is self-evident, and requires no special operation. In this case, conversion is performed without any specific operation, with only model names being converted.

As described above, in the first embodiment, the second recognition processing units 106 and 107 can easily convert the transition path set C0_PT(t) selected by the first recognition processing unit 105 into C1_PT(t) and C2_PT(t). In this case, for the acoustic model C0 DB 102, the acoustic model C1 database 103, and the acoustic model C2 database 104, HMMs having the same topology are used for each category.

(Flowchart of Operation of First Embodiment)

Figure 8:
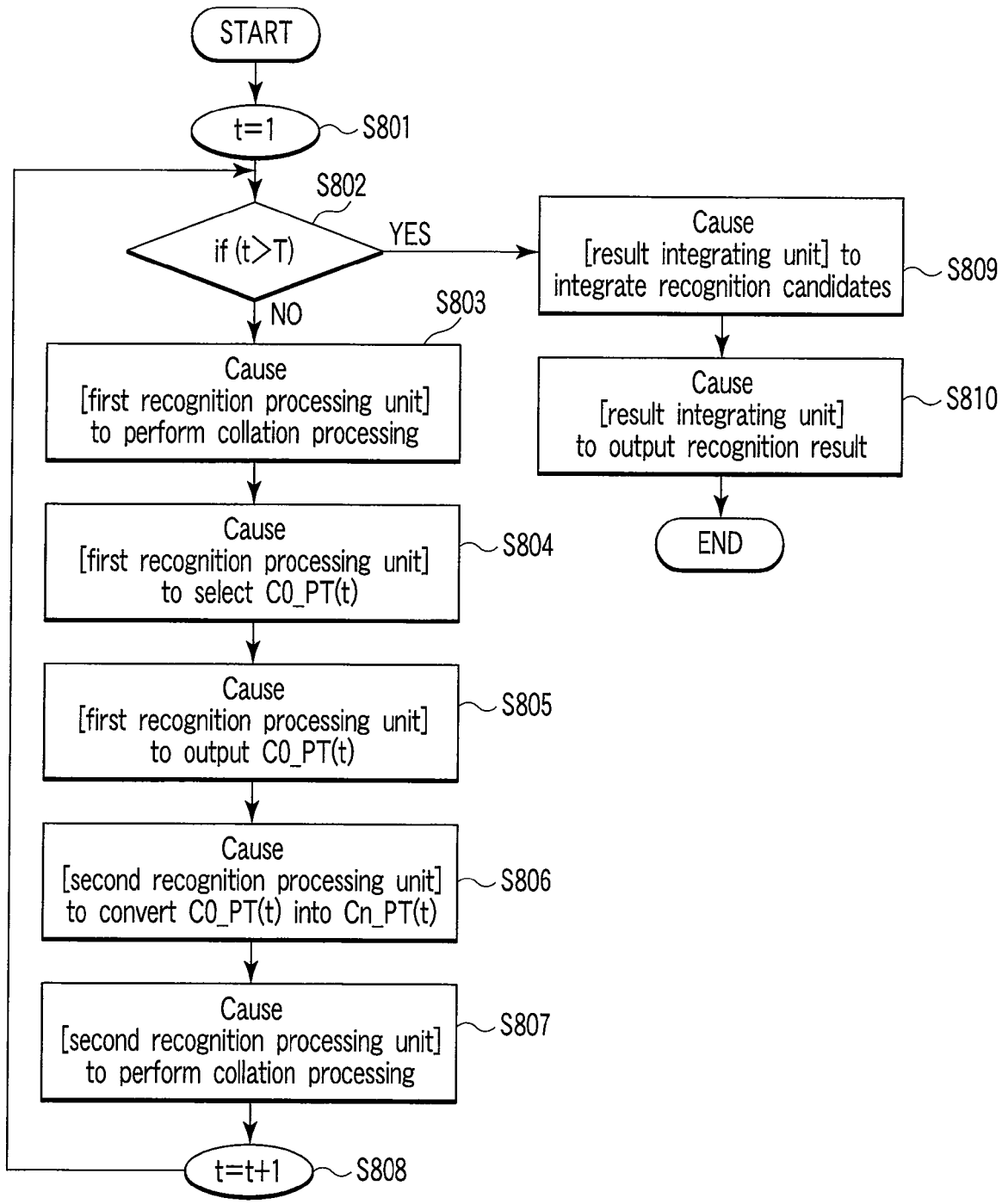
FIG. 8 is a flowchart showing an example of the operation of the speech recognition apparatus in FIG. 1.
Figure 9:
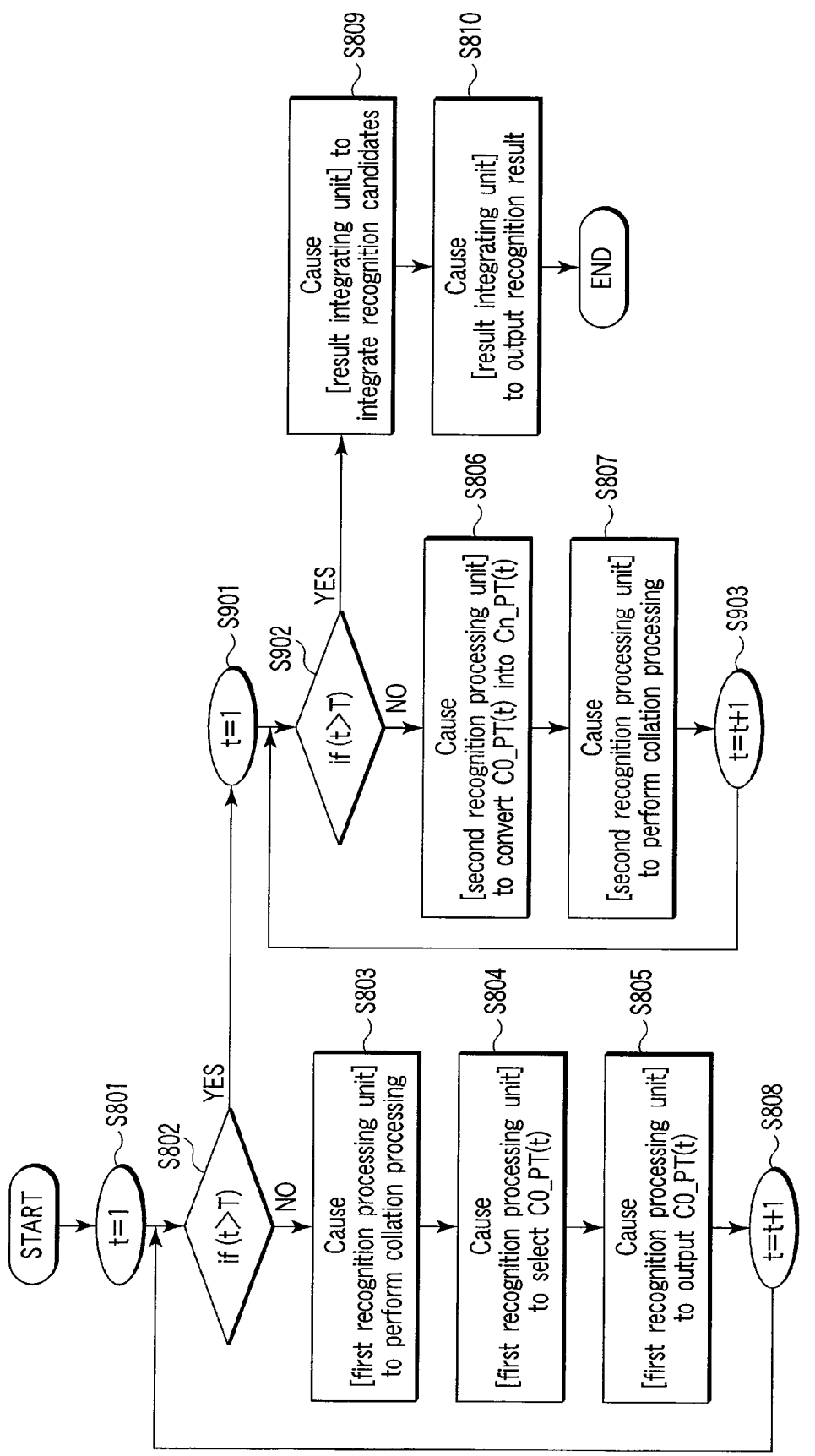
FIG. 9 is a flowchart showing an example of the operation of the speech recognition apparatus in FIG. 1.

The operation of the first embodiment will be described next with reference to FIGS. 8, 9, and 10. FIGS. 8, 9, and 10 are flowcharts each showing an example of the operation of the first embodiment. Note that since the flowchart of the operation of the feature extracting unit 101 is obvious to those skilled in the art, a description of the flowchart is omitted.

The operation based on the flowchart of FIG. 8 will be described step by step. According to an example of the operation shown in the flowchart of FIG. 8, the first recognition processing unit 105 and the second recognition processing units 106 and 107 sequentially perform collation processing for each frame.

(S801) The first recognition processing unit 105 and the second recognition processing units 106 and 107 starts processing from frame 1.

(S802) If processing at frame T is complete, the process advances to step S809. Otherwise, processing in step S803 and subsequent steps are executed.

(S803) The first recognition processing unit 105 executes collation processing at frame t.

(S804) The first recognition processing unit 105 selects the transition path set C0_PT(t).

(S805) The first recognition processing unit 105 outputs the transition path set C0_PT(t) to the second recognition processing units 106 and 107.

(S806) The second recognition processing units 106 and 107 convert the transition path set C0_PT(t) into C1_PT(t) and C2_PT(t), respectively.

(S807) The second recognition processing units 106 and 107 each execute collation processing at frame t.

(S808) The first recognition processing unit 105 and the second recognition processing units 106 and 107 terminate the processing at the current frame and start processing at the next frame.

(S809) The result integrating unit 108 integrates recognition candidates output from the first recognition processing unit 105 and the second recognition processing units 106 and 107.

(S810) The result integrating unit 108 outputs a recognition result basted on the integration of the recognition candidates.

The operation based on the flowchart of FIG. 9 will be described next step by step. According to an example of the operation shown in the flowchart of FIG. 9, the first recognition processing unit 105 executes collation processing first, and then the second recognition processing units 106 and 107 start collation processing. The same step numbers denote the same steps as those described above, and a repetitive description will be omitted.

(S901) If the processing at frame T is complete in step S802, the second recognition processing units 106 and 107 start processing from frame 1.

(S902) If the processing at frame T is complete, the process advances to step S809. Otherwise, step S806 and subsequent steps are executed.

(S903) The processing at the current frame is terminated, and processing at the next frame is started.

The operation based on the flowchart of FIG. 10 will be described step by step. According to an example of the operation shown in the flowchart of FIG. 10, first of all, the first recognition processing unit 105 executes collation processing first. After the termination of the collation processing, the first recognition processing unit 105 selects the transition path set C0_PT(t) and outputs it to the second recognition processing units 106 and 107 altogether. Before collation processing in the second recognition processing units 106 and 107, the transition path set C0_PT(t) is converted into Cn_PT(t) altogether. Thereafter, the second recognition processing units 106 and 107 perform collation processing.

(S1001) If the first recognition processing unit 105 has finished the collation processing at frame T, the first recognition processing unit 105 selects the transition path set C0_PT(t) with respect all frames t $1 \leq t \leq T$).

(S1002) The first recognition processing unit 105 outputs the transition path set C0_PT(t) to the second recognition processing units 106 and 107.

(S1003) The second recognition processing units 106 and 107 convert the transition path set C0_PT(t) into C1_PT(t) and C2_PT(t) with respect to all frames t ($1 \leq t \leq T$).

(S1004) The second recognition processing units 106 and 107 start collation processing from frame 1.

(S1005) If the processing at frame T is complete, the process advances to step S809. Otherwise, step S807 and subsequent steps are executed.

(S1006) The second recognition processing units 106 and 107 terminate the processing at this frame and start processing at the next frame.

As shown in FIGS. 8, 9, and 10, the first embodiment can be executed in accordance with various flowcharts of operation. This applies to other embodiments.

As described above, the first embodiment can reduce the calculation cost required for collation processing in the second recognition processing units 106 and 107 without affecting the performance as compared with the conventional technique.

(Technique of Selecting Transition Path Set in First Recognition Processing Unit)

The first embodiment can use various techniques of selecting the transition path set C0_PT(t) in the first recognition processing unit 105. Such selection techniques will be described below as the second and third embodiments.

Second Embodiment

As a technique of selecting a transition path set C0_PT(t) in a first recognition processing unit 105, there is available a technique of executing a beam search in collation processing in the first recognition processing unit 105 and selecting a transition path as a unit of search by the beam search. This technique will be described as the second embodiment. The arrangement of a preferred speech recognition apparatus according to the second embodiment is the same as that shown in FIG. 1 which explains the preferred speech recognition apparatus according to the first embodiment. In addition, flowcharts of operation are the same as those in the first embodiment which are exemplified by FIGS. 8, 9, and 10. Only the technique of selecting the transition path set C0_PT(t) in the first recognition processing unit 105 will be described below with reference to FIG. 11.

Figure 11:
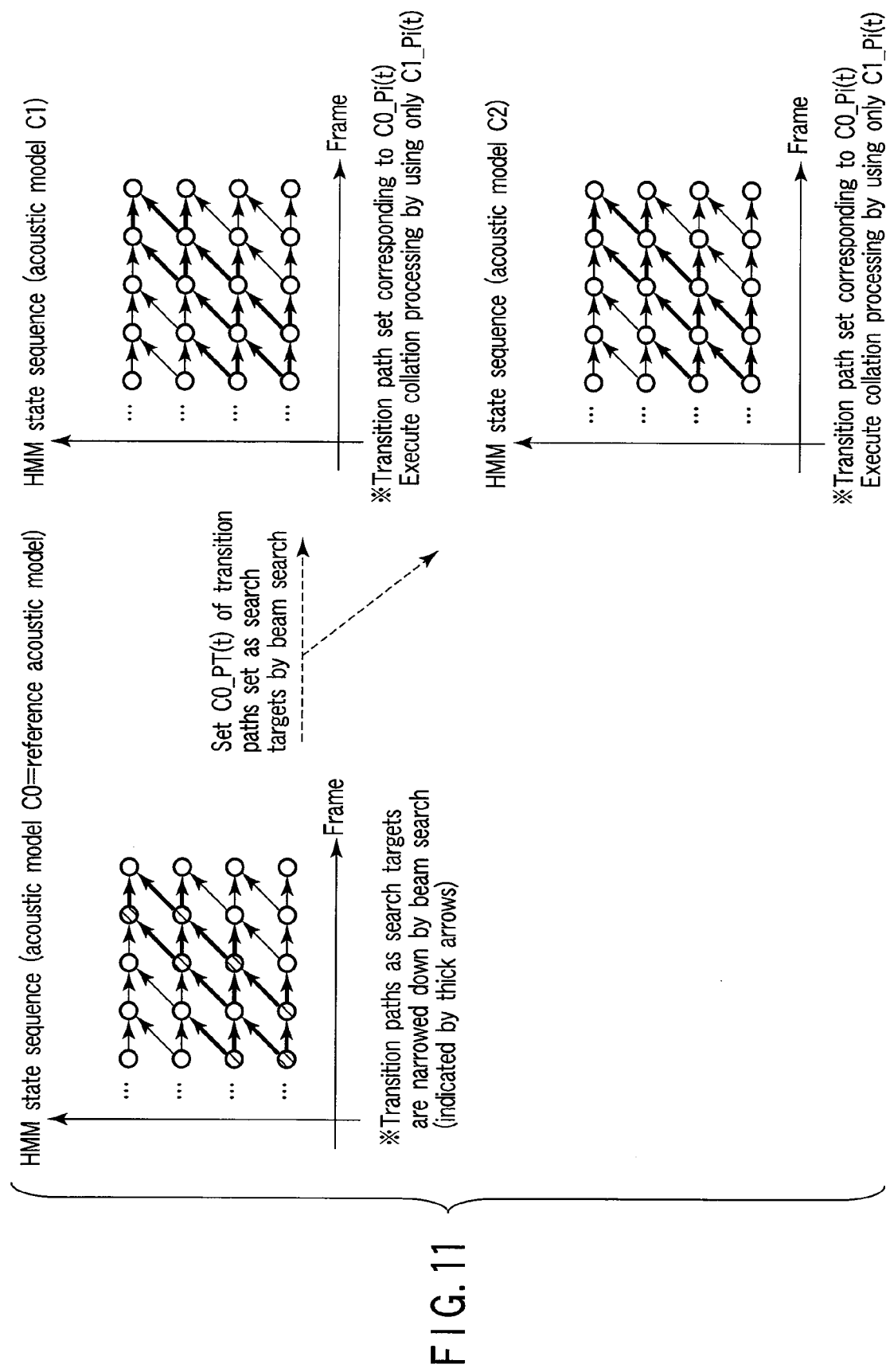
FIG. 11 is a view showing a transition path conversion technique in a first recognition processing unit in the second embodiment.

FIG. 11 shows part of a forward probability calculation procedure in a case wherein the Left-to-Right HMM exemplified in FIG. 2 is used as an acoustic model. According to the second embodiment exemplified in FIG. 11, the first recognition processing unit 105 executes a beam search to narrow down the states and transition paths of an HMM as search targets for each frame. There are various techniques as beam search execution techniques. For example, one or more states having higher forward probabilities are selected for each frame, and a forward probability is calculated with respect to a state which can transition from the selected state at the next frame.

In the case shown in FIG. 11, in calculation of a forward probability using an acoustic model C0 DB 102 in the first recognition processing unit 105, each state having a higher forward probability which is selected for each frame is indicated by a hatched circle. In the case in FIG. 11, two states having the first and second highest probabilities are selected for each frame. In addition, referring to FIG. 11, transition paths selected by a beam search, i.e. transition paths from the states selected by the beam search, are indicated by the thick arrows. Transition paths to be referred to in the calculation of a forward probability by the execution of a beam search are limited to the transition paths selected by the beam search.

In the case shown in FIG. 11 according to the second embodiment, first of all, the first recognition processing unit 105 executes collation processing accompanying a beam search performed by the first recognition processing unit 105 using the acoustic model C0 DB 102. In this process, the transition paths selected by the beam search are selected as the transition path set C0_PT(t), and outputs it to second recognition processing units 106 and 107. The second recognition processing units 106 and 107 convert the transition path set C0_PT(t) into C1_PT(t) and C2_PT(t) in collation processing using an acoustic model C1 database 103 and an acoustic model C2 database 104, and execute collation processing by referring to only the transition paths belonging to the transition path sets C1_PT(t) and C2_PT(t), respectively. In the case shown in FIG. 11, a forward probability is calculated by referring to only the transition paths indicated by the thick arrows in FIG. 11. This procedure is executed at all the frames.

As described above, the second embodiment determines transition paths to be referred to in the calculation of forward probabilities in the second recognition processing units 106 and 107, i.e., a search range, on the basis of a beam search result in the first recognition processing unit 105. Executing a beam search makes it possible to reduce the total number of transition paths whose forward probabilities are to be calculated in the first recognition processing unit 105 and the second recognition processing units 106 and 107. This can therefore reduce the calculation cost. In addition, in the second embodiment, only the first recognition processing unit 105 requires a calculation cost for the execution of a beam search, and the second recognition processing units 106 and 107 require no calculation cost. This can reduce the calculation cost as compared with a case wherein the first recognition processing unit 105 and the second recognition processing units 106 and 107 independently execute beam searches. As described in the first embodiment, a transition path which provides a higher forward probability in collation processing using the acoustic model C0 DB 102 than other transition paths can be considered as a good approximation of a transition path which provides a higher forward probability in collation processing using the acoustic model C1 database 103 and the acoustic model C2 database 104 than other transition paths. That is, the second embodiment can reduce the calculation cost required for collation processing without affecting the performance as compared with the conventional technique.

Third Embodiment

As a technique of selecting a transition path set C0_PT(t) in a first recognition processing unit 105, there is available a technique of executing collation processing in the first recognition processing unit 105 with respect to all frames to obtain a time sequence of transition paths which provide maximum output probabilities for the respective categories as recognition targets, and selecting this time sequence of transition paths as the transition path set C0_PT(t). This technique will be described as the third embodiment. The arrangement of a preferred speech recognition apparatus according to the third embodiment is the same as that shown in the block diagram of FIG. 1 which explains the preferred speech recognition apparatus according to the first embodiment, and the operation of each block is the same as that in the first embodiment. Note, however, that the flowchart of operation in this embodiment complies with the flowchart of operation in the first embodiment which is shown in FIG. 10. Only the technique of selecting the transition path set C0_PT(t) in the first recognition processing unit 105 will be described below with reference to FIG. 12.

FIG. 12 shows an example of a procedure of calculating the maximum output probability with respect to a given category in a case wherein the Left-to-Right HMM exemplified by FIG. 2 is used as an acoustic model. In the third embodiment exemplified by FIG. 12, the first recognition processing unit 105 obtains the maximum value of an output probability P(X|w, C0) corresponding to a category w as a given recognition target by using an acoustic model $\overline{C0}$ DB 102. In this case, the first recognition processing unit 105 selects a time sequence of transition paths which provides the maximum value of the output probability P(X|w, C0) as the transition path set C0_PT(t). Referring to FIG. 12, an example of a time sequence of transition paths which provides the maximum value of the output probability P(X|w, C0) is indicated by the thick arrows. This procedure is executed for all categories.

After all collation processing is complete, the first recognition processing unit 105 outputs the transition path set C0_PT(t) to second recognition processing units 106 and 107. In collation processing using the acoustic model C1 database 103 and the acoustic model C2 database 104, the second recognition processing units 106 and 107 convert the transition path set C0_PT(t) into C1_PT and C2_PT(t), respectively. Since C0_PT(t) contains a time sequence of transition paths corresponding to a given category, C1_PT(t) and C2_PT(t) also contain time sequences of transition paths corresponding to the same category. The second recognition processing units 106 and 107 then execute collation processing by referring to only the transition paths belonging to the transition path sets C1_PT(t) and C2_PT(t). In the case shown in FIG. 12, forward probabilities are calculated by only referring to the transition paths indicated by the thick arrows in FIG. 12.

As described above, according to the third embodiment, the second recognition processing units 106 and 107 calculate forward probabilities and output probabilities by referring to only a time sequence of transition paths which provides the maximum output probability with respect a given category in collation processing in the first recognition processing unit 105. This allows each of the second recognition processing units 106 and 107 to calculate a forward probability corresponding to a given category by referring to only one transition path for each frame, thereby reducing the calculation cost. In this case, as described in the first embodiment, a time sequence of transition paths which provides the maximum output probability in collation processing using the acoustic model C0 DB 102 can be considered as a good approximation of a time sequence of transition paths which provides the maximum output probability in collation processing using an acoustic model C1 database 103 and an acoustic model C2 database 104. That is, the third embodiment can reduce the calculation cost required for collation processing without affecting the performance as compared with the conventional technique.

Fourth Embodiment

<Transition Path Set Conversion Technique in Second Recognition Processing Unit>

In the first embodiment, the second recognition processing units 106 and 107 convert the transition path set C0_PT(t) of the acoustic model C0 DB 102 output from the first recognition processing unit 105 into the transition path sets C1_PT(t) and C2_PT(t) of the acoustic model C1 database 103 and acoustic model C2 database 104. This conversion technique will be described as the fourth embodiment.

FIG. 13 shows the arrangement of a preferred speech recognition apparatus according to the fourth embodiment. The arrangement of the preferred speech recognition apparatus according to the fourth embodiment additionally includes a transition path conversion table storage unit 1301 as compared with the arrangement of the preferred embodiment of the speech recognition apparatus according to the first embodiment shown in FIG. 1. The operation of each block is the same as that in the first embodiment except that second recognition processing units 106 and 107 operate by referring to the transition path conversion table storage unit 1301. In addition, the flowcharts of operation are the same as those in the first embodiment which have been exemplified by FIGS. 8, 9, and 10. Only a technique of converting a transition path set C0_PT(t) into C1_PT(t) and C2_PT(t) in the second recognition processing units 106 and 107 will be described below with reference to FIG. 14.

Figure 14:
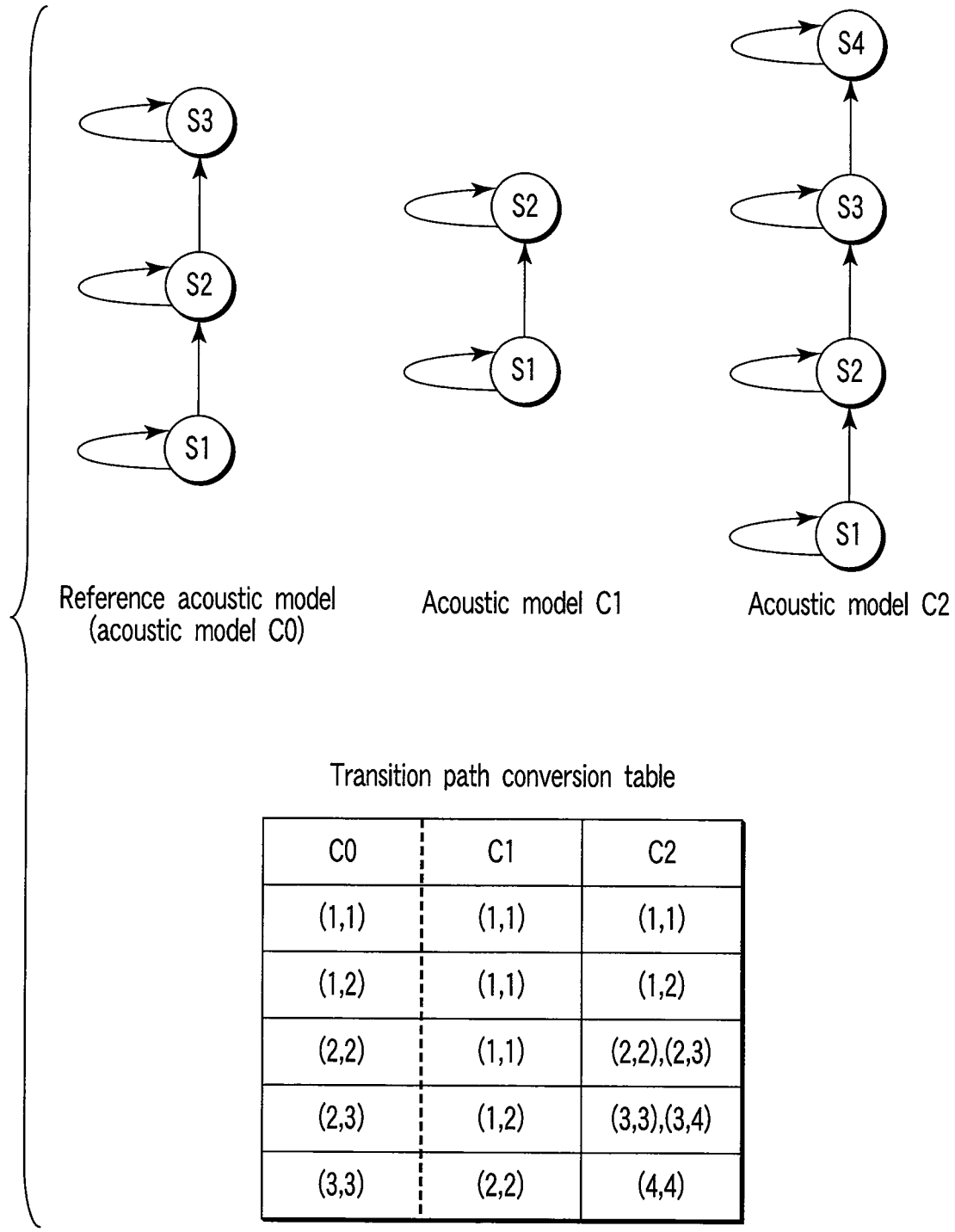
FIG. 14 is a transition path conversion technique in the fourth embodiment.

The transition path conversion table storage unit 1301 holds the correlation relationship between an arbitrary transition path (j, i) of an acoustic model C0 DB 102 and transition paths of an acoustic model C1 database 103 and acoustic model C2 database 104. FIG. 14 shows an example of the transition path conversion table storage unit 1301. FIG. 14 shows an example of a transition path conversion table contained in the transition path conversion table storage unit 1301 in a case wherein HMMs having different topologies are used for the respective acoustic models. As is obvious from FIG. 14, using the transition path conversion table storage unit 1301 makes it possible to know, with respect to an arbitrary transition path (j, i) of the acoustic model C0 DB 102, corresponding transition paths of the acoustic model C1 database 103 and acoustic model C2 database 104.

As exemplified by FIG. 14, different transition paths of the acoustic model C2 database 104 sometimes correspond to one transition path of the acoustic model C0 DB 102. In addition, one transition path of the acoustic model C1 database 103 sometimes corresponds to different transition paths of the acoustic model C0 DB 102. In this manner, the transition path conversion table storage unit 1301 can hold arbitrary correspondence relationships between transition paths among a plurality of acoustic models, i.e., many-to-one, one-to-many, and many-to-many relationships. Although FIG. 14 exemplifies the case wherein HMMs having different topologies are used for the respective acoustic models, the transition path conversion table storage unit 1301 can be used for a case wherein several acoustic models use HMMs having the same topology or all acoustic models use HMMs having the same topology.

As described above, according to the fourth embodiment, the second recognition processing units 106 and 107 can easily convert the transition path set C0_PT(t) selected by the first recognition processing unit 105 into C1_PT(t) and C2_PT(t) by referring to the transition path conversion table storage unit 1301. Note that the fourth embodiment can be executed in combination with the first to third embodiments which have already been described above. That is, the first to third embodiments each can additionally include the transition path conversion table storage unit 1301.

Fifth Embodiment

<Switching of Reference Acoustic Models>

As described in the first embodiment, arbitrary acoustic models can be used as the acoustic model C0 DB 102, acoustic model C1 database 103, and acoustic model C2 database 104. In addition, these acoustic models can be switched and used. This technique will be described below as the fifth embodiment.

Figure 15:
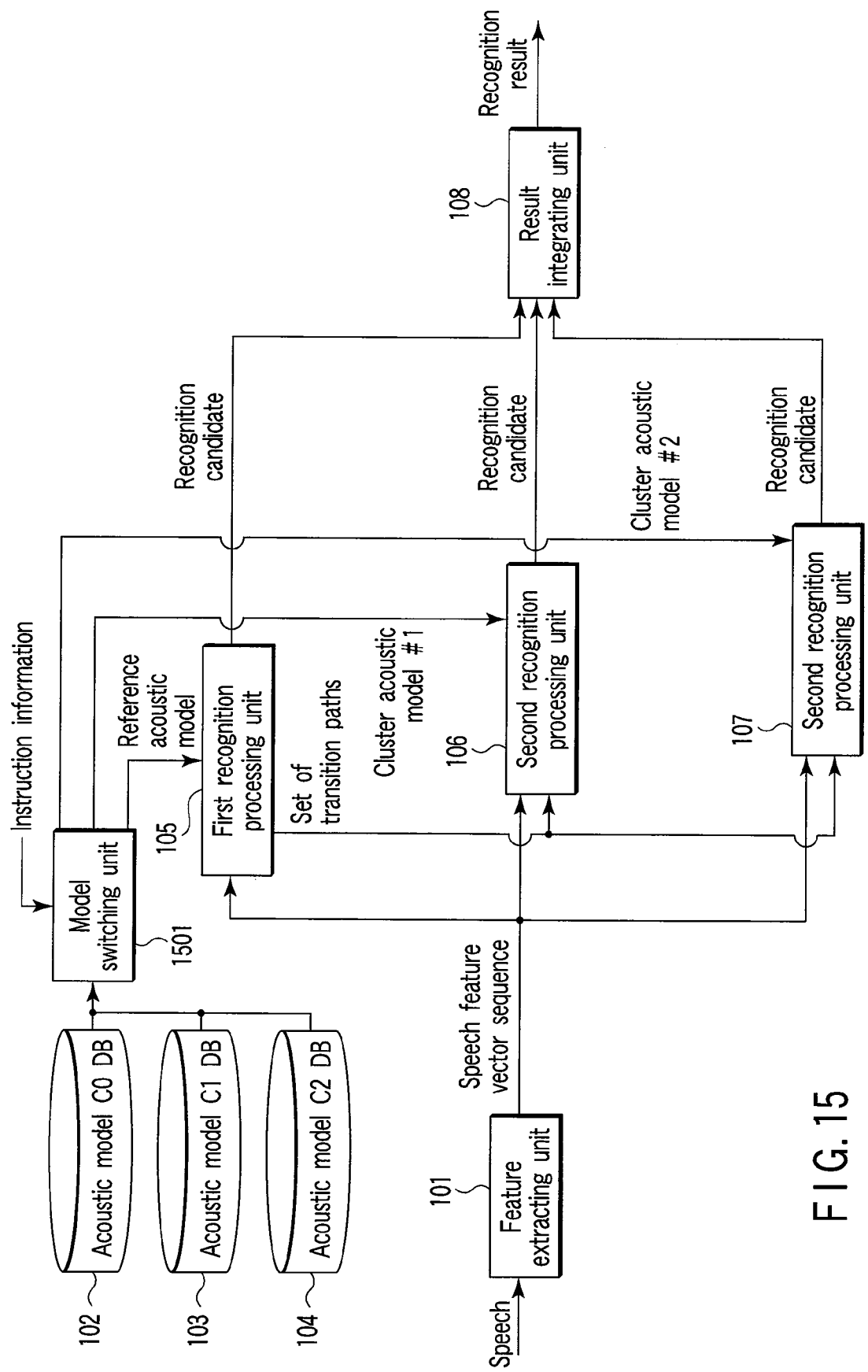
FIG. 15 is a block diagram showing a speech recognition apparatus according to the fifth embodiment.

FIG. 15 shows the arrangement of a preferred speech recognition apparatus of the fifth embodiment. The arrangement of the preferred speech recognition apparatus of the fifth embodiment additionally includes a model switching unit 1501 as compared with the arrangement of the preferred speech recognition apparatus of the first embodiment. In addition, this embodiment differs from the first embodiment in that acoustic models to be used by a first recognition processing unit 105 are switched through the model switching unit 1501, and acoustic models to be used by second recognition processing units 106 and 107 are switched through the model switching unit 1501. The operations of other blocks are the same as those in the first embodiment. In addition, the flowcharts of operation are the same as those in the first embodiment exemplified by FIGS. 8, 9, and 10 except that acoustic model switching operation by the model switching unit 1501 is inserted at an arbitrary time point. Only the operation associated with acoustic model switching by the model switching unit 1501 will therefore be described below.

In the fifth embodiment, the model switching unit 1501 holds an acoustic model C0 DB 102, acoustic model C1 database 103, and acoustic model C2 database 104. The model switching unit 1501 selects one of held acoustic models on the basis of instruction information from a host unit, and sets it as a reference acoustic model to be used by the first recognition processing unit 105 while setting other acoustic models as acoustic models to be used by the second recognition processing units 106 and 107. That is, the mode switching unit 1501 selects one of the acoustic model C0 DB 102, acoustic model C1 database 103, and acoustic model C2 database 104 as a reference acoustic model to be used by the first recognition processing unit 105.

The operation of the model switching unit 1501 according to the fifth embodiment will be described with reference to a concrete example. Consider a case wherein three types of acoustic models respectively correspond to the three types of clusters "unspecified speaker", "male", and "female". Assume that the sex of a speaker is unspecified. In this case, before the start of speech recognition processing, the model switching unit 1501 sets an acoustic model corresponding to the cluster "unspecified speaker" as the reference acoustic model C0 DB 102, and also sets acoustic models corresponding to the clusters "male" and "female" as the acoustic model C1 database 103 and the acoustic model C2 database 104, respectively. Thereafter, speech recognition processing is performed in the same manner as the flowcharts of operation in the first embodiment exemplified by FIGS. 8, 9, and 10.

Assume that the sex of a speaker is known, for example, it is known that the speaker is male. In this case, before the start of speech recognition processing, the model switching unit 1501 sets an acoustic model corresponding to the cluster "male" as the reference acoustic model C0 DB 102, and then can perform speech recognition processing in the same manner as indicated by the flowcharts of operation in the first embodiment exemplified by FIGS. 8, 9, and 10. As described above, using the model switching unit 1501 makes it possible to set, as the reference acoustic model C0 DB 102, an acoustic model obtained by modeling a feature of input speech, a feature of the speaker corresponding to the sex in this case, more properly. As a result, a transition path set selected by the first recognition processing unit 105 is likely to provide a higher forward probability than other transition path sets in collation processing in the second recognition processing units 106 and 107.

As described above, according to the fifth embodiment, it is possible to use, as a reference acoustic model to be used by the first recognition processing unit 105, one of acoustic models of the acoustic model C0 DB 102, acoustic model C1 database 103, and acoustic model C2 database 104 which are selected by the model switching unit 1501. At this time, the second recognition processing units 106 and 107 are to use acoustic models other than the acoustic model selected as the reference acoustic model by the model switching unit 1501. Note that the fifth embodiment can be executed in combination with the first to fourth embodiments. That is, the first to fourth embodiments can additionally include the model switching unit 1501. FIG. 15 exemplifies the arrangement of the preferred speech recognition apparatus in a case wherein the fifth embodiment is executed in combination with the first to fourth embodiments. FIG. 16 exemplifies the arrangement of a preferred speech recognition apparatus in a case wherein the fifth embodiment is executed in combination with the fourth embodiment. When the fifth embodiment is to be executed in combination with the first to fourth embodiments, the descriptions of the first to fourth embodiments can be applied without any change by replacing the acoustic model to be used by the first recognition processing unit 105 and the acoustic models to be used by the second recognition processing units 106 and 107 with the acoustic models selected by the model switching unit 1501.

According to the embodiments described above, in the technique of executing a plurality of recognition processes by using acoustic models corresponding to a plurality of clusters, integrating a plurality of recognition processing results, and outputting the recognition result, reducing the number of times of calculation of forward probabilities makes it possible to efficiently reduce the calculation cost required for recognition processing without affecting the recognition performance.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A speech recognition apparatus comprising:
a generating unit configured to generate a speech feature vector expressing a speech feature for each of a plurality of frames obtained by dividing an input speech between a start time and an end time and including frames from a start frame to an end frame;
a first storage unit configured to store a first acoustic model obtained by modeling a speech feature of each word by using a state transition model including a plurality of states and a plurality of transition paths, each word being included in the input speech;
a second storage unit configured to store at least one second acoustic model different from the first acoustic model;
a first calculation unit configured to calculate, for each state, a first probability of transition to a state at the end frame for each word from the first acoustic model and a speech feature vector sequence from the start frame to the end frame to obtain a plurality of first probabilities for each word, and select a maximum probability of the first probabilities;
a selection unit configured to select, for each word, a maximum probability transition path corresponding to the maximum probability, the maximum probability transition path indicating transition from a start state at the start frame to an end state at the end frame;
a conversion unit configured to convert, for each word, the maximum probability transition path into a corresponding transition path corresponding to the second acoustic model;
a second calculation unit configured to calculate, for each word, a second probability of transition to the state at the end frame on the corresponding transition path from the second acoustic model and the speech feature vector sequence; and
a finding unit configured to find, as a recognized word, a word corresponding to a maximum value among the maximum probability for each word at the end frame and the second probability for each word at the end frame.

2. A speech recognition apparatus comprising:
a generating unit configured to generate a speech feature vector expressing a speech feature for each of a plurality of frames obtained by dividing an input speech between a start time and an end time and including frames from a start frame to an end frame;
a first storage unit configured to store a first acoustic model obtained by modeling a speech feature of each word by using a state transition model including a plurality of states and a plurality of transition paths, each word being included in the input speech;
a second storage unit configured to store at least one second acoustic model different from the first acoustic model;
a first calculation unit configured to calculate, for each state, a first probability of transition to a state at the end frame for each word from the first acoustic model and a speech feature vector sequence from the start frame to the end frame to obtain a plurality of first probabilities for each word, and select a maximum probability of the first probabilities;
a selection unit configured to select, for each word, a maximum probability transition path corresponding to the maximum probability, the maximum probability transition path indicating transition from a start state at the start frame to an end state at the end frame;
a conversion unit configured to convert, for each word, the maximum probability transition path into a corresponding transition path corresponding to the second acoustic model;
a second calculation unit configured to calculate, for each word, a second probability of transition to the state at the end frame on the corresponding transition path from the second acoustic model and the speech feature vector sequence; and
a finding unit configured to calculate, for each word, a sum of the maximum probability at the end frame and the second probability at the end frame and finds, as a recognized word, a word exhibiting a maximum sum of the sums.

3. A speech recognition apparatus comprising:
a generating unit configured to generate a speech feature vector expressing a speech feature for each of a plurality of frames obtained by dividing an input speech between a start time and an end time and including frames from a start frame to an end frame;
a first storage unit configured to store a first acoustic model obtained by modeling a speech feature of each word by using a state transition model including a plurality of states and a plurality of transition paths, each word being included in the input speech;
a second storage unit configured to store at least one second acoustic model different from the first acoustic model;
a first calculation unit configured to calculate, for each state, a first probability of transition to a state at the end frame for each word from the first acoustic model and a speech feature vector sequence from the start frame to the end frame to obtain a plurality of first probabilities for each word, and select a maximum probability of the first probabilities;

a selection unit configured to select, for each word, a maximum probability transition path corresponding to the maximum probability, the maximum probability transition path indicating transition from a start state at the start frame to an end state at the end frame;

a conversion unit configured to convert, for each word, the maximum probability transition path into a corresponding transition path corresponding to the second acoustic model;

a second calculation unit configured to calculate, for each word, a second probability of transition to the state at the end frame on the corresponding transition path from the second acoustic model and the speech feature vector sequence; and a finding unit configured to calculate, for each word, an absolute value of a difference between the maximum probability at the end frame and the second probability at the end frame and finds, as a recognized word, a finding word of words exhibiting absolute values not less than a threshold, the finding word corresponding to a maximum value among the maximum probability at the end frame and the probability at the end frame.

4. The apparatus according to claim 3, wherein the first acoustic model and the second acoustic model use state transition models having the same topology.

5. The apparatus according to claim 3, further comprising a storage unit configured to store a transition path conversion table indicating a correspondence relationship between first transition paths of the first acoustic model and second transition paths of the second acoustic model, and
wherein the conversion unit converts a first transition path of the first acoustic model into a second transition path of the second acoustic model which corresponds to the first transition path.

6. The apparatus according to claim 3, further comprising setting unit configured to setting a first acoustic model to be used by the first calculation unit and a second acoustic model to be used by the second calculation unit by switching the first acoustic model and the second acoustic model.

7. A speech recognition apparatus comprising:

a generating unit configured to generate a first speech feature vector expressing a speech feature for each of a plurality of frames obtained by dividing an input speech between a start time and an end time and including frames from a first frame to a second frame next to the first frame;

a first storage unit configured to store a first acoustic model obtained by modeling a speech feature of each word by using a state transition model including a plurality of states and a plurality of first transition paths, each word being included in the input speech;

a second storage unit configured to store at least one second acoustic model different from the first acoustic model;

a first calculation unit configured to calculate, for each state, a first probability of transition to a state at the second frame for each word from the first acoustic model, a second probability of transition to the state at the first frame and a second speech feature vector of the second frame to obtain a plurality of first probabilities for each word, and select a maximum probability of the first probabilities;

a selection unit configured to select, for each word, at least a maximum probability transition path of the maximum probability transition path and a plurality of second transition paths, the maximum probability transition path corresponding to the maximum probability and indicating transition from a first state at the first frame to a second state at the second frame, the second transition paths having probabilities lower than the maximum probability;

a conversion unit configured to convert, for each word, the maximum probability transition path, or the maximum probability transition path and at least one second transition path when the second transition path of the second transition paths is selected, into at least one corresponding transition path corresponding to the second acoustic model;

a second calculation unit configured to calculate, for each word, a third probability of transition to the second state at the second frame on the corresponding transition path from the second acoustic model, the second speech feature vector and a fourth probability of transition to the second state at the first frame;

an operation unit configured to repeatedly operate the first calculation unit, the selection unit, the conversion unit, and the second calculation unit until the second frame becomes an end frame; and a finding unit that calculates an absolute value of a difference between the maximum probability at the end frame for each word and the third probability at the end frame for each word and finds, as a recognized word, a finding word of words exhibiting absolute values not less than a threshold, the finding word corresponding to a maximum value among the maximum probability at the end frame and the third probability at the end frame.

8. The apparatus according to claim 7, wherein the first acoustic model and the second acoustic model use state transition models having the same topology.

9. The apparatus according to claim 7, further comprising a storage unit configured to store a transition path conversion table indicating a correspondence relationship between transition paths of the first acoustic model and transition paths of the second acoustic model, and
wherein the conversion unit converts a first transition path of the first acoustic model into a second transition path of the second acoustic model which corresponds to the first transition path.

10. The apparatus according to claim 7, further comprising setting unit configured to setting a first acoustic model to be used by the first calculation unit and a second acoustic model to be used by the second calculation unit by switching the first acoustic model and the second acoustic model.

11. The apparatus according to claim 7, wherein the selection unit selects only the maximum probability transition path.

12. The apparatus according to claim 7, wherein the selection unit selects a plurality of transition paths.

13. A speech recognition method comprising:

generating a first speech feature vector expressing a speech feature for each of a plurality of frames obtained by dividing an input speech between a start time and an end time and including frames from a first frame to a second frame next to the first frame;

storing in a first storage unit a first acoustic model obtained by modeling a speech feature of each word by using a state transition model including a plurality of states and a plurality of first transition paths, each word being included in the input speech;

storing in a second storage unit at least one second acoustic model different from the first acoustic model;

calculating, for each state, a first probability of transition to a state at the second frame for each word from the first acoustic model, a second probability of transition to the state at the first frame and a second speech feature vector of the second frame to obtain a plurality of first probabilities for each word;

selecting a maximum probability of the first probabilities;

selecting, for each word, at least a maximum probability transition path of the maximum probability transition path and a plurality of second transition paths, the maximum probability transition path corresponding to the maximum probability and indicating transition from a first state at the first frame to a second state at the second frame, the second transition paths having probabilities lower than the maximum probability;

converting, for each word, the maximum probability transition path, or the maximum probability transition path and at least one second transition path when the second transition path of the second transition paths is selected, into at least one corresponding transition path corresponding to the second acoustic model;

calculating, for each word, a third probability of transition to the second state at the second frame on the corresponding transition path from the second acoustic model, the second speech feature vector and a fourth probability of transition to the second state at the first frame;

repeatedly operating calculating the first probability of transition, selecting the maximum probability transition path, converting the maximum probability transition path, or the maximum probability transition path and the second transition path when the second transition path of the second transition paths is selected, and calculating the second probability until the second frame becomes an end frame;

calculating an absolute value of a difference between the maximum probability at the end frame for each word and the third probability at the end frame for each word; and finding, as a recognized word, a finding word of words exhibiting absolute values not less than a threshold, the finding word corresponding to a maximum value among the maximum probability at the end frame and the third probability at the end frame.

14. A non-transitory computer readable storage medium storing instructions of a computer program which when executed by a computer results in performance of steps comprising:

generating a first speech feature vector expressing a speech feature for each of a plurality of frames obtained by dividing an input speech between a start time and an end time and including frames from a first frame to a second frame next to the first frame;

storing in a first storage unit a first acoustic model obtained by modeling a speech feature of each word by using a state transition model including a plurality of states and a plurality of first transition paths, each word being included in the input speech;

storing in a second storage unit at least one second acoustic model different from the first acoustic model;

calculating, for each state, a first probability of transition to a state at the second frame for each word from the first acoustic model, a second probability of transition to the state at the first frame and a second speech feature vector of the second frame to obtain a plurality of first probabilities for each word;

selecting a maximum probability of the first probabilities;

selecting, for each word, at least a maximum probability transition path of the maximum probability transition path and a plurality of second transition paths, the maximum probability transition path corresponding to the maximum probability and indicating transition from a first state at the first frame to a second state at the second frame, the second transition paths having probabilities lower than the maximum probability;

converting, for each word, the maximum probability transition path, or the maximum probability transition path and at least one second transition path when the second transition path of the second transition paths is selected, into at least one corresponding transition path corresponding to the second acoustic model;

calculating, for each word, a third probability of transition to the second state at the second frame on the corresponding transition path from the second acoustic model, the second speech feature vector and a fourth probability of transition to the second state at the first frame;

repeatedly operating calculating the first probability of transition, selecting the maximum probability transition path, converting the maximum probability transition path, or the maximum probability transition path and the second transition path when the second transition path of the second transition paths is selected, and calculating the second probability until the second frame becomes an end frame;

calculating an absolute value of a difference between the maximum probability at the end frame for each word and the third probability at the end frame for each word; and finding, as a recognized word, a finding word of words exhibiting absolute values not less than a threshold, the finding word corresponding to a maximum value among the maximum probability at the end frame and the third probability at the end frame.

* * * * *